(12) United States Patent
Ganesh et al.

(10) Patent No.: US 7,415,466 B2
(45) Date of Patent: *Aug. 19, 2008

(54) PARALLEL TRANSACTION RECOVERY

(75) Inventors: Amit Ganesh, Mountain View, CA (US);
Gary C. Ngai, Saratoga, CA (US)

(73) Assignee: Oracle International Corporation,
Redwood Shores, CA (US)

( * ) Notice: Subject to any disclaimer, the term of this patent is extended or adjusted under 35 U.S.C. 154(b) by 544 days.

This patent is subject to a terminal disclaimer.

(21) Appl. No.: 10/804,976

(22) Filed: Mar. 18, 2004

(65) Prior Publication Data

US 2004/0177099 A1 Sep. 9, 2004

Related U.S. Application Data

(63) Continuation of application No. 09/156,548, filed on Sep. 17, 1998, now abandoned, which is a continuation-in-part of application No. 08/618,443, filed on Mar. 19, 1996, now Pat. No. 5,850,507.

(51) Int. Cl.
*G06F 17/30* (2006.01)
(52) U.S. Cl. ............... 707/8; 707/200; 714/15
(58) Field of Classification Search ............... 707/1–10, 707/100–104.1, 200–206; 711/161, 162; 714/13–20, 2
See application file for complete search history.

(56) References Cited

U.S. PATENT DOCUMENTS

| | | |
|---|---|---|
| 5,065,311 A | 11/1991 | Masai et al. |
| 5,155,678 A | 10/1992 | Fukumoto et al. |
| 5,170,480 A | 12/1992 | Mohan et al. |
| 5,201,044 A | 4/1993 | Frey, Jr. et al. |
| 5,280,611 A | 1/1994 | Mohan et al. |
| 5,333,303 A | 7/1994 | Mohan |
| 5,333,314 A | 7/1994 | Masai et al. |
| 5,335,343 A | 8/1994 | Lampson et al. |
| 5,440,727 A | 8/1995 | Bhide et al. |
| 5,481,699 A | 1/1996 | Saether |
| 5,485,608 A | 1/1996 | Lomet et al. |
| 5,524,205 A | 6/1996 | Lomet et al. |
| 5,524,239 A | 6/1996 | Fortier |
| 5,524,241 A | 6/1996 | Ghoneimy et al. |

(Continued)

OTHER PUBLICATIONS

Kumar A., An analysis of borrowing policies for escrow transactions replicated data environment, Dec. 5-9, 1990, IEEE, 446-454.*

(Continued)

*Primary Examiner*—Jean B Fleurantin
(74) *Attorney, Agent, or Firm*—Hickman Palermo Truong & Becker LLP; Edward A. Becker

(57) ABSTRACT

A method and system for recovering after a crash of an instance in a database is disclosed. According to the method, a plurality of dead transactions associated with the crashed instance are identified. Statistical data is compiled from the identified plurality of dead transactions. Based on the statistical data, it is determined that a particular number of recovery servers should be used to recover the plurality of dead transactions. The plurality of dead transactions are then recovered using the particular number of recovery servers. The particular number of recovery servers can execute in parallel to recover the plurality of dead transactions.

37 Claims, 13 Drawing Sheets

U.S. PATENT DOCUMENTS

| | | |
|---|---|---|
| 5,551,046 A | 8/1996 | Mohan et al. |
| 5,561,795 A | 10/1996 | Sarkar |
| 5,596,710 A | 1/1997 | Voigt |
| 5,630,047 A | 5/1997 | Wang |
| 5,734,817 A | 3/1998 | Roffe et al. |
| 5,819,020 A | 10/1998 | Beeler, Jr. |
| 5,832,516 A * | 11/1998 | Bamford et al. ............ 707/202 |
| 5,850,507 A | 12/1998 | Ngai et al. |
| 5,857,204 A | 1/1999 | Lordi et al. |
| 5,933,838 A | 8/1999 | Lomet |
| 5,974,563 A | 10/1999 | Beeler, Jr. |
| 6,067,550 A | 5/2000 | Lomet |
| 6,178,428 B1 | 1/2001 | Pystynen et al. |
| 6,182,241 B1 | 1/2001 | Ngai et al. |
| 6,185,577 B1 | 2/2001 | Nainani et al. |
| 6,185,699 B1 | 2/2001 | Haderle et al. |
| 6,295,610 B1 | 9/2001 | Ganesh et al. |

OTHER PUBLICATIONS

Budhiraja N et al., Tradeoffs in implementing primary-backup protocols, Oct. 25-28, 1995, IEEE, 280-288.*

Mohan, et al., Aries-RRH: Restricted Repeating of History in TEH Aries Transaction Recovery Method, Data Engineering, 7$^{th}$ International Conference IEEE, pp. 718-727, Dec. 1991.

Microsoft Press, "Microsoft Press Computer Dictionary, Third Edition," pp. 408, Sep. 1997.

Oxford University Press, "Dictionary of Computing, Fourth Edition," pp. 125, 199, Dec. 1996.

IBM Corp., IBM Technical Disclosure Bulletin, vol. 28, No. 3, pp. 950-951, Dec. 1991.

* cited by examiner

US 7,415,466 B2

PARALLEL TRANSACTION RECOVERY

RELATED APPLICATION

This application is a continuation of and claims priority to U.S. patent application Ser. No. 09/156,548, entitled PARALLEL TRANSACTION RECOVERY, filed on Sep. 17, 1998 now abandoned, which is a continuation-in-part of and claims priority to U.S. patent application Ser. No. 08/618,443, now issued as U.S. Pat. No. 5,850,507, entitled METHOD AND APPARATUS FOR IMPROVED TRANSACTION RECOVERY, filed on Mar. 19, 1996, the contents of which are herein incorporated by reference in their entirety for all purposes.

FIELD OF THE INVENTION

The present invention relates to database management systems (DBMS). More specifically, the present invention relates to a method and apparatus for providing a parallel recovery mechanism for recovering after a crash of an instance in a database.

BACKGROUND OF THE INVENTION

In typical database systems, users store, update and retrieve information by submitting commands to a database application. To be correctly processed, the commands must comply with the database query language that is supported by the database application. One popular database query language is known as Structured Query Language (SQL).

A logical unit of work that is atomic and comprised of one or more database language statements is referred to as a transaction. In a database sever, an area of system memory is allocated and one or more processes are started to execute one or more transactions. The database server communicates with connected user processes and performs tasks on behalf of the user. These tasks typically include the execution of transactions. The combination of the allocated system memory and the processes executing transactions is commonly termed a database instance.

A buffer cache resides in a portion of the system memory and holds database information. Buffers in the buffer cache hold copies of data blocks that have been read from data files. The buffers are shared by all user processes concurrently connected to the instance. When a transaction desires to make a change to a data block, a copy of the data block is loaded into a buffer and the change is made to the copy of the data block stored in the database buffer cache in dynamic memory. Afterwards, a database writer writes the modified blocks of data from the database buffer cache to the data files on disk.

The system memory also contains a redo log buffer. A redo log buffer is a buffer that holds information about update operations recently performed by transactions. This information is stored in redo entries. Redo entries contain the information necessary to reconstruct, or redo, changes made by operations such as INSERT, UPDATE, DELETE, CREATE, ALTER, or DROP, for example. Redo entries are generated for each change made to a copy of a data block stored in the database buffer cache. The redo log buffer is written to an active online redo log file group on disk by a background process. The records in the online redo log file group on disk are referred to as redo logs.

An instance failure can occur when a problem arises that prevents an instance from continuing work. Instance failures may result from hardware problems such as a power outage, or software problems such as an operating system or database system crash. Instance failures can also occur expectedly, for example, when a SHUTDOWN ABORT or a STARTUP FORCE statement is issued.

Due to the way in which database updates are performed to data files in some database systems, at any given point in time, a data file may contain some data blocks that (1) have been tentatively modified by uncommitted transactions and/or (2) do not yet reflect updates performed by committed transactions. Thus, an instance recovery operation must be performed after an instance failure to restore a database to the transaction consistent state it possessed just prior to the instance failure. In a transaction consistent state, a database reflects all the changes made by transactions which are committed and none of the changes made by transactions which are not committed.

A typical DBMS performs several steps during an instance recovery. First, the DBMS rolls forward, or reapplies to the data files all of the changes recorded in the redo log. Rolling forward proceeds through as many redo log files as necessary to bring the database forward in time to reflect all of the changes made prior to the time of the crash. Rolling forward usually includes applying the changes in online redo log files, and may also include applying changes recorded in archived redo log files (online redo files which are archived before being reused). By rolling forward, the data blocks will contain all committed changes as well as any uncommitted changes that were recorded in the redo log files prior to the crash.

After the DBMS rolls forward, the DBMS rolls back. During rollback, changes made by uncommitted transactions are removed from the database. Records for undoing uncommitted changes are persistently stored at locations referred to as rollback segments. In database recovery, the information contained in the rollback segments is used to undo the changes made by transactions that were uncommitted at the time of the crash. The process of undoing changes made by the uncommitted transactions is referred to as "rolling back" the transactions.

FIG. 1 illustrates rolling forward and rolling back. Database 110 is a database requiring recovery at time $t_1$. Database 120 represents the database after a redo log is applied at time $t_2$. The database 120 comprises both changes made by committed transactions 121 and changes made by uncommitted transactions 122. Database 130 represents the database at time $t_3$ after a rollback segment is applied. The database 130 comprises only changes made by committed transactions 121.

When rolling back a transaction, the DBMS releases any resources (locks) held by the transaction at the time of failure. Lastly, the DBMS resolves any pending distributed transactions that were undergoing a two-phase commit coordinated by the DBMS at the time of the instance failure.

Conventionally, to recover after a database instance crash, the DBMS invokes a single process to rollback any changes that were made by dead transactions. Once invoked, the single process performs the necessary recover tasks. In general, using a single process to rollback all changes can help ensure proper consistency of the database once the changes have been applied.

A drawback associated with using a single process to recover after a database instance crash is that it can induce a bottleneck in the system as changes that were made by uncommitted transactions are forced to be rolled back serially. In certain cases, a large number of transactions may be active when an instance crashes, and therefore, a large number of uncommitted transactions may need to be rolled back. This large, number of uncommitted transactions may include changes to portions of the database which are of immediate need. Thus, access to certain portions of the database may be delayed for a relatively long period of time, as serially rolling back a large number of uncommitted transactions can be very time consuming.

Based on the foregoing, it is highly desirable to provide a mechanism for reducing the amount of time that is required for the recovery of uncommitted transactions.

SUMMARY OF THE INVENTION

The present invention provides a method for recovering after a crash of an instance by undoing changes that were performed on the database by transactions that were uncommitted at the time of the crash.

According to one aspect of the invention, a method is described for recovering dead transactions after a crash of an instance of a database. According to the method, a plurality of dead transactions are identified. Statistical data is then generated based on the plurality of dead transactions that are identified. Using the statistical data, it is determined that a particular number of recovery servers should be used to recover the plurality of dead transactions. The plurality of dead transactions are then recovered using that particular number of recovery servers.

According to one aspect of the invention, the plurality of dead transactions are recovered by executing the particular number of recovery servers in parallel.

According to another aspect of the invention, a block count is maintained for each active transaction and is used to identify the number of undo blocks that are associated with each dead transaction. Statistical data is then generated based on the total number of undo blocks that need to be recovered.

According to one aspect of the invention, the block counts are maintained in a transaction table.

According to another aspect of the invention, a max_parallelism threshold value is used to provide an upper limit for the number of recovery servers to be used.

According to another aspect of the invention, a set of dead transactions is identified that includes one or more dead transactions that are associated with a rollback segment that is owned by the crashed instance. The identified set of dead transactions are then assigned to a recovery server to be rolled back on the crashed instance.

According to another aspect of the invention, a rollback segment, that was previously owned by the crashed instance at the time of its crash, is identified. After the crashed instance is restarted, it reacquires ownership of the identified rollback segment.

According to another aspect of the invention, an instance, that currently owns a rollback segment that was previously owned by the crashed instance at the time of its crash, is identified. After the crashed instance is restarted, the instance is requested to release ownership of the rollback segment. In response to the request, the instance releases ownership of the rollback segment.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE PREFERRED EMBODIMENT

A method and apparatus for recovering after a crash of an instance in a database is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
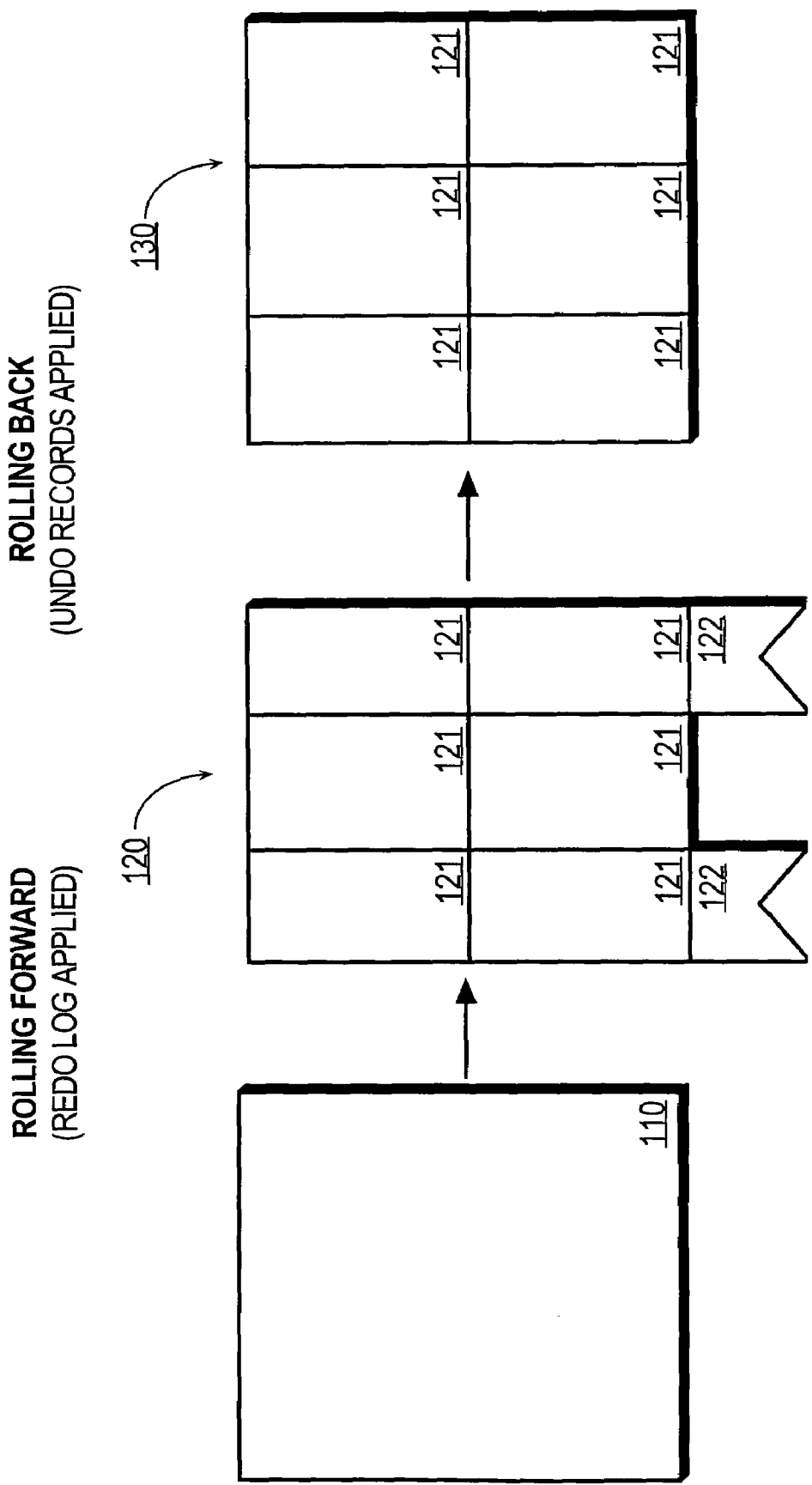
FIG. 1 illustrates rolling forward and rollback operations.
Figure 2:
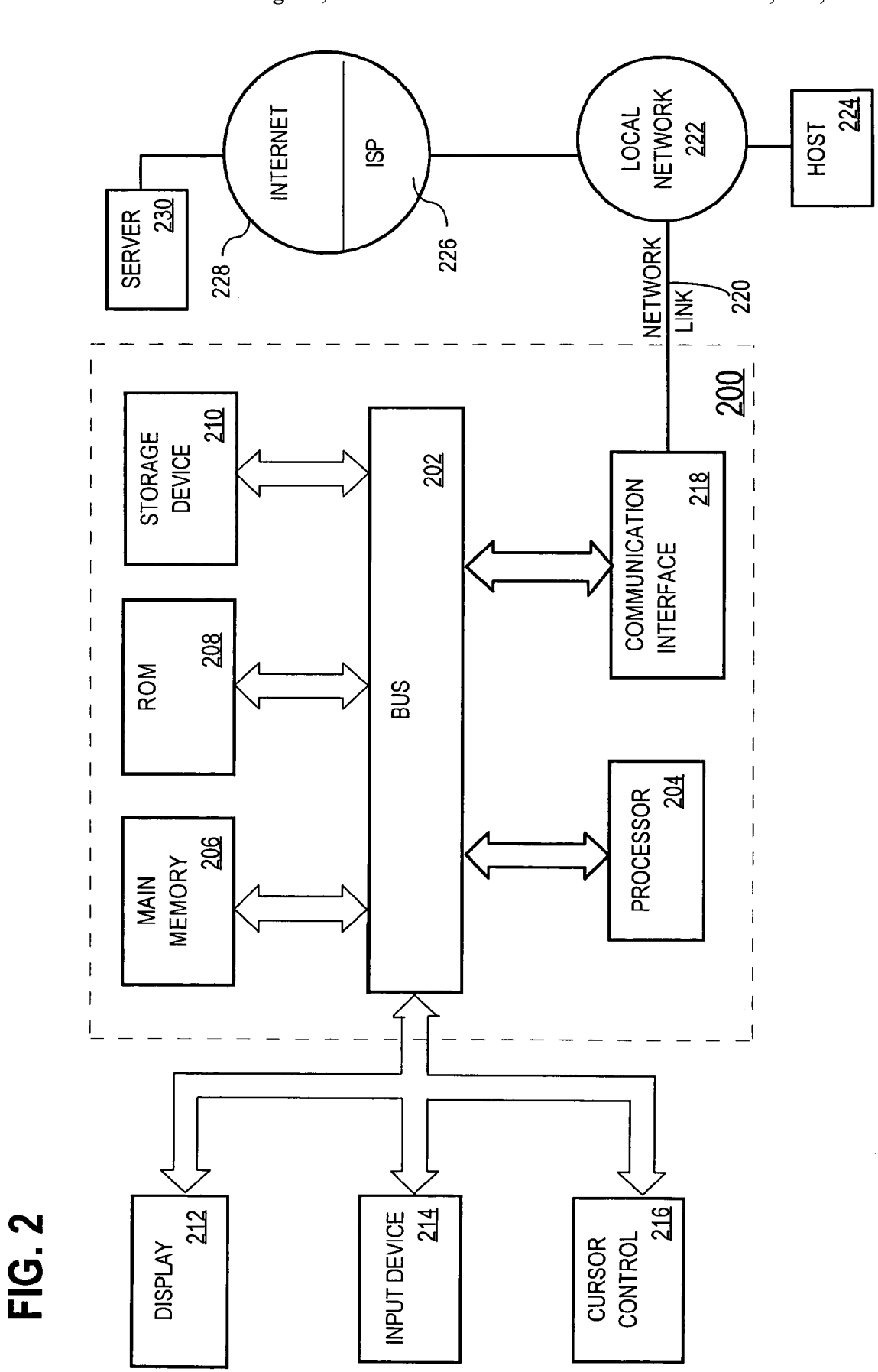
FIG. 2 is a block diagram of a system that may be programmed to implement the present invention.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for the recovering dead transactions after a crash of an instance. According to one embodiment of the invention, recovery of dead transactions after a crash of an instance is provided by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector coupled to bus 202 can receive the data carried in the infra-red signal and place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. In accordance with the invention, one such downloaded application provides for the recovery of dead transactions after a crash of an instance as described herein.

The received code may be executed by processor 204 as it is received, and/or stored in storage device 210, or other non-volatile storage for later execution. In this manner, computer system 200 may obtain application code in the form of a carrier wave.

ROLLBACK SEGMENTS

According to one embodiment of the invention, each database contains one or more rollback segments. Each rollback segment contains a transaction table and a plurality of undo records.

Figure 3A:
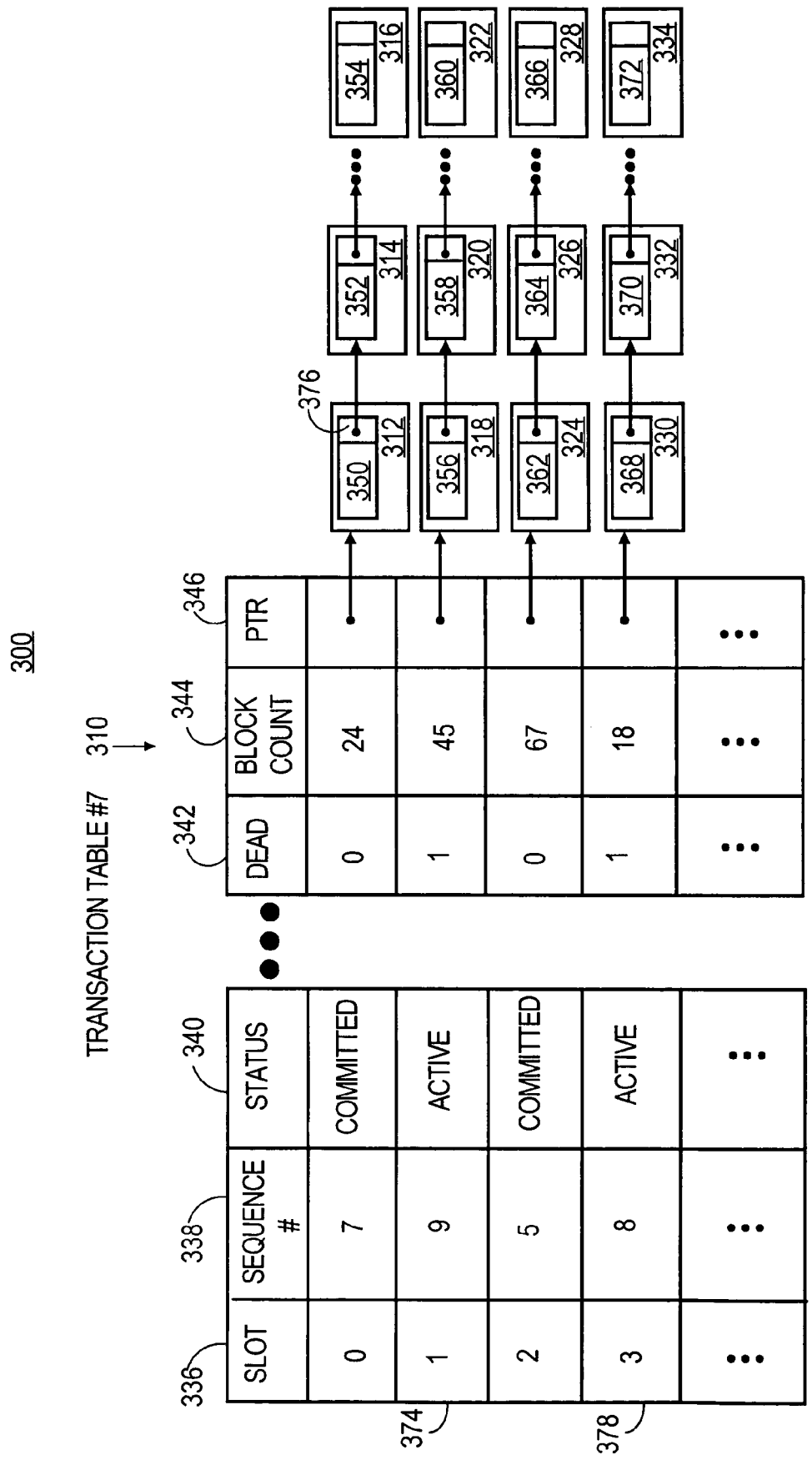
FIG. 3A illustrates an exemplary rollback segment according to an embodiment of the invention.

FIG. 3A illustrates an exemplary rollback segment 300 with a transaction table 310 and a plurality of undo blocks 312-334. As depicted, transaction table 310 includes a plurality of slots 336, where each slot can hold an entry that corresponds to a transaction. Each entry contains a sequence number 338, a status indication 340, a "DEAD" field 342 for indicating whether or not the corresponding transaction is dead, an block count 344, and a pointer 346 which points to the most recent undo record associated with the transaction.

The status flag 340 indicates whether the transaction that corresponds to the entry is active or has committed. The DEAD field 342 is used to identify whether a particular transaction is dead. The block count 344 is used to keep a running count of the number of undo blocks that are associated with a particular entry in the transaction table. Thus, when a transaction dies, the block count can be used to estimate the amount of work that will be required to recover the dead transaction.

Figure 3B:
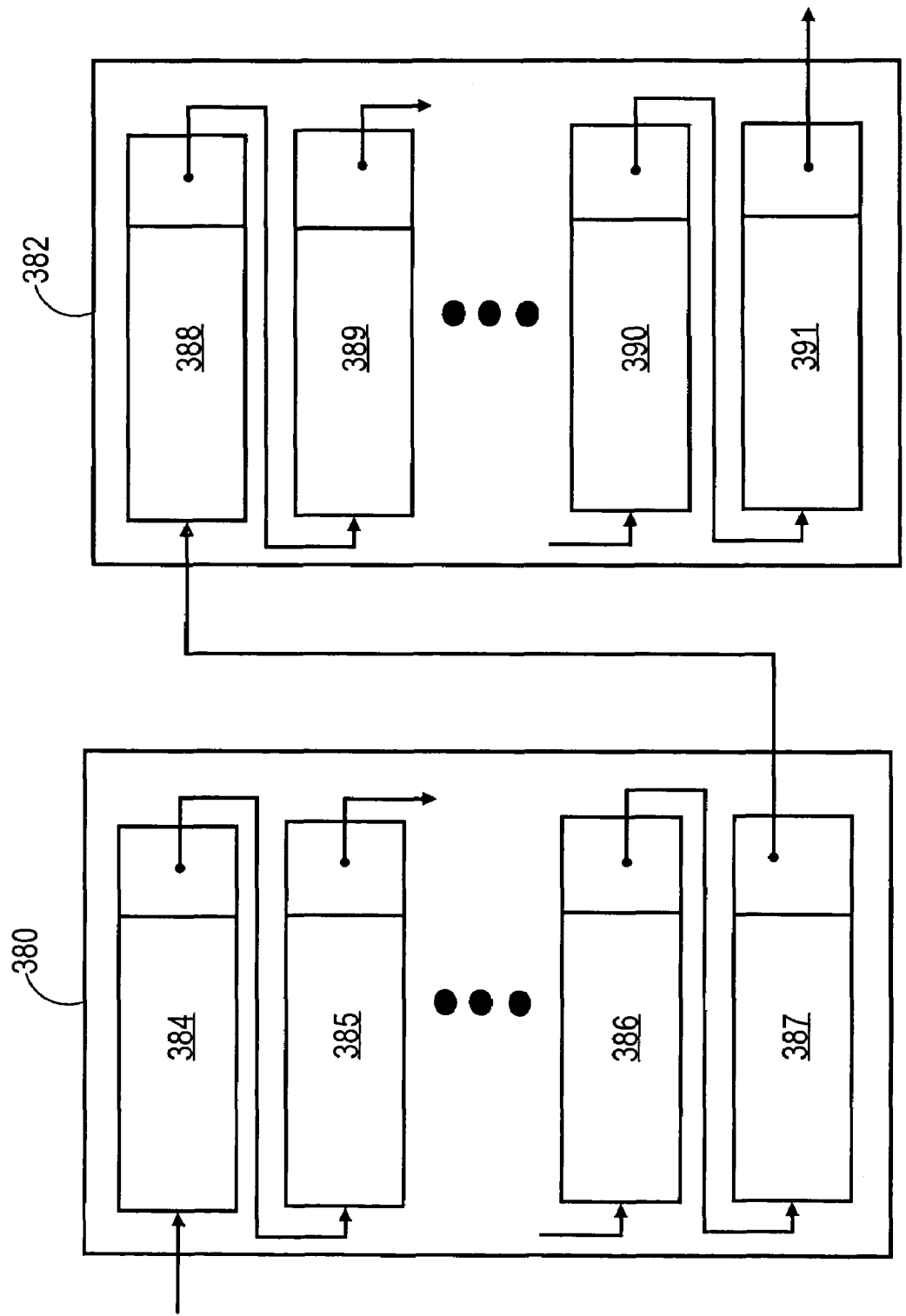
FIG. 3B depicts undo blocks containing a plurality of undo records in accordance with an embodiment of the invention.

For explanation purposes, the undo blocks 312-334 are depicted having only a single undo redo record. However in certain embodiments, undo blocks contain a plurality of undo records. For example, FIG. 3B depicts two undo blocks 380 and 382 each respectively containing a plurality of undo records 384-387 and 388-391.

Referring back to FIG. 3A, the undo records 350-372 contain undo information that specifies how to remove the changes that were made to the database while performing an operation in a particular transaction. Undo records for the same transaction are linked together by pointers 376 to form an undo record chain for a particular transaction.

Undo records in a particular undo record chain are time ordered. The pointer 346 for a particular entry in the transaction table 310 points to the undo record (head) that contains the most recent change made by the corresponding transaction. In this example, undo records 350, 356, 362 and 368 contain the most recent change information while undo records 354, 360, 366 and 372 contain the least recent change information for the transactions which correspond to the entries in transaction table 310.

The number of entries that a particular transaction table can hold is limited. When a transaction table is full and an entry needs to be added for a new transaction, the entry that corresponds to the oldest transaction is overwritten with the new entry. To distinguish between transactions that have used the same slot, the sequence number 338 for a slot is changed every time the slot is reused. For example, every time a slot is reused, the sequence number may be incremented.

To uniquely identify transactions, transaction IDs are generated from the information contained in the transaction table entries that correspond to the transaction. In one embodiment, the transaction ID of a transaction consists of the number of the transaction table that contains the entry for the transaction, the slot number that holds the entry, and the sequence number of the transaction.

DATA CONTAINERS

Figure 4:
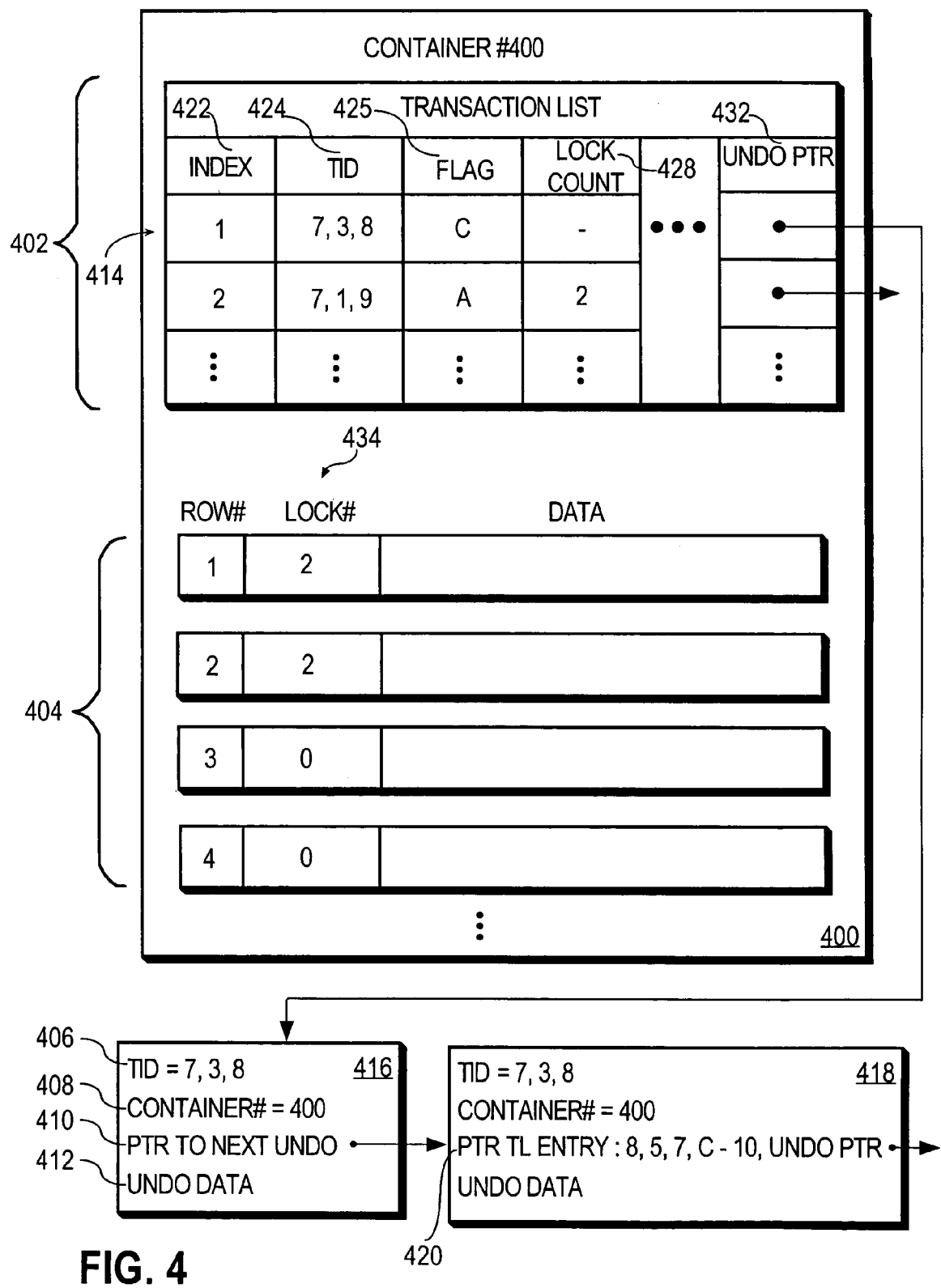
FIG. 4 illustrates a data container and rollback records of a database according to an embodiment of the invention.

When data in the database is changed in response to the execution of a transaction, the transaction ID of the transaction is stored with the data to identify the transaction that made the changes. Referring to FIG. 4, it illustrates an exemplary data container 400 of a database. The data container 400 includes a transaction list section 402 and a data section 404. The transaction list section 402 includes entries that correspond to transactions that have modified data container 400. Each entry includes an index number 422, a transaction ID 424, a status flag 425, a lock count indicator 428, and an undo pointer 432.

The status flag 425 indicates whether the transaction that corresponds to the entry is active or has committed. The lock count indicator 428 indicates how many rows within the block are write locked by the transaction. The undo pointer 432 points to an undo record in the rollback segment that indicates how to undo the most recent change made to the block by the transaction that corresponds to the entry.

The data section of the block includes rows of data. A portion of each row is used as a write lock indicator 434 to indicate whether the row is currently write locked. In the preferred embodiment, the write lock indicator 434 contains a number that indicates the entry in the transaction list belonging to the transaction that holds the lock on the row in question.

UNDO RECORDS

FIG. 4 also illustrates the contents of an undo record in a rollback segment and how the undo record is accessed by an undo pointer according to an embodiment of the invention. The undo record includes a transaction ID 406, a block number 408, a prior change pointer 410, and undo information 412. The transaction ID 406 identifies the transaction which performed the operation that corresponds to the undo record. The block number 408 indicates the data container on which the operation was performed. The undo information 412 contains data necessary for undoing the operation that was performed on the identified block by the identified transaction.

The undo pointer 410 points to an undo record 418 for undoing a previous change to the same block by the same transaction. Each change made to the block by a transaction is linked in this manner to form a linked list of undo records. The undo pointer for a transaction listed in the transaction list section 402 points to the head of the linked list, and therefore to the undo record that represents the most recent change to the block made by the transaction. At the other end of the linked list is the undo record that corresponds to the first change made to the block by the transaction.

The undo record that corresponds to the first change made to the block by a particular transaction does not contain a pointer to an undo record for an earlier change to the block by the same transaction, since there can be no change earlier than the first change. Rather, the undo record that corresponds to the first change made by a transaction to a block contains the entry that was overwritten in the transaction list of the block by the entry for the transaction at issue.

In the illustrated example, the entry 414 corresponds to the transaction identified by the transaction ID "7,3,8". The undo pointer in entry 414 points to the undo record 416 that corresponds to the last change made to data container 400 by transaction "7,3,8". The undo pointer of undo record 416 points to undo record 418 that corresponds to the first change made to data container 400 by transaction "7,3,8". Thus, transaction "738" made two updates to the data in data container 400. The undo record 418 contains a record 420 of the entry that was overwritten by entry 414.

RECOVERY AFTER AN INSTANCE FAILURE

Figure 5A:
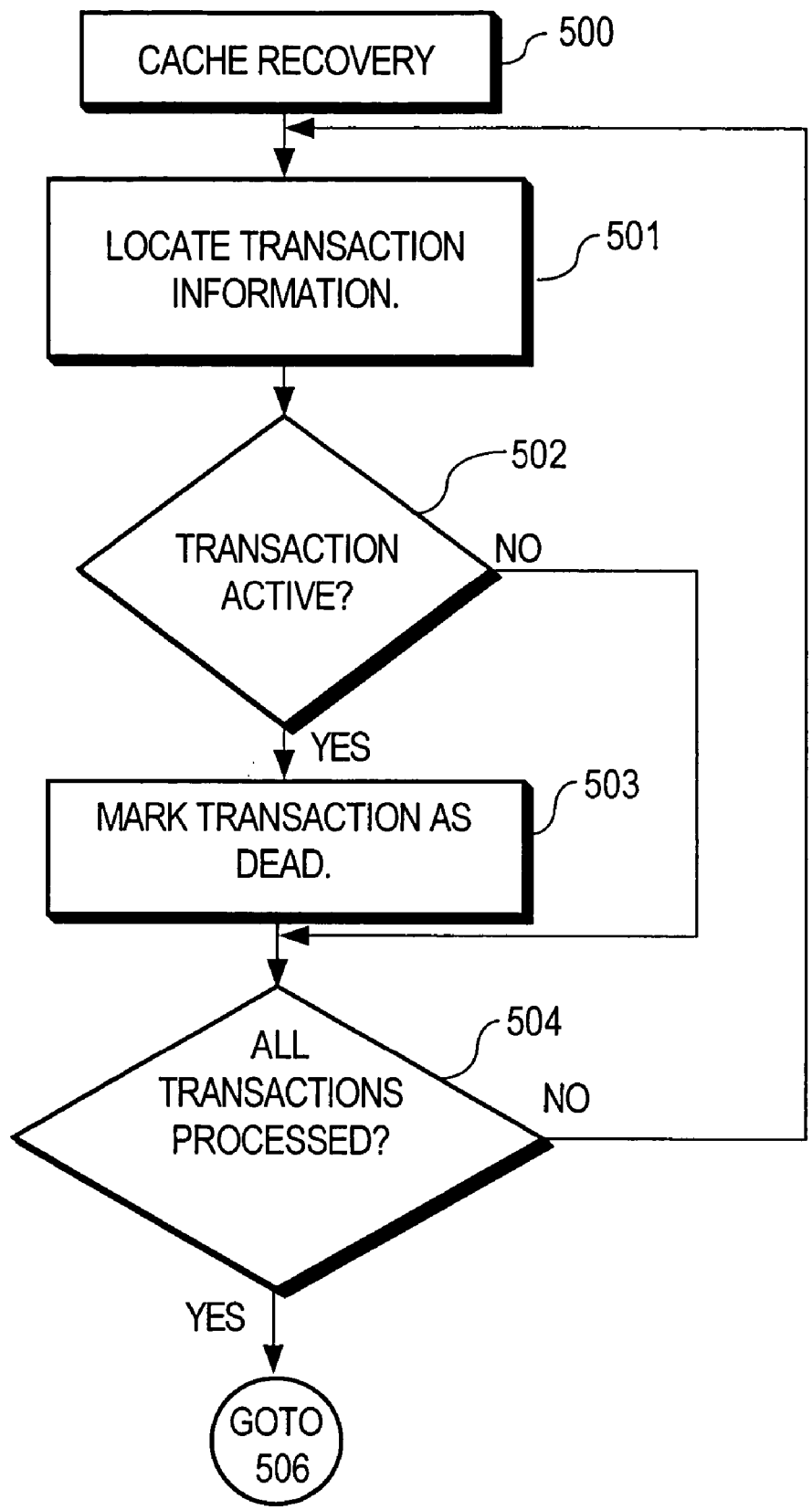
FIG. 5A is a portion of a flow diagram illustrating a method for recovering after an instance failure in a database.
Figure 5B:
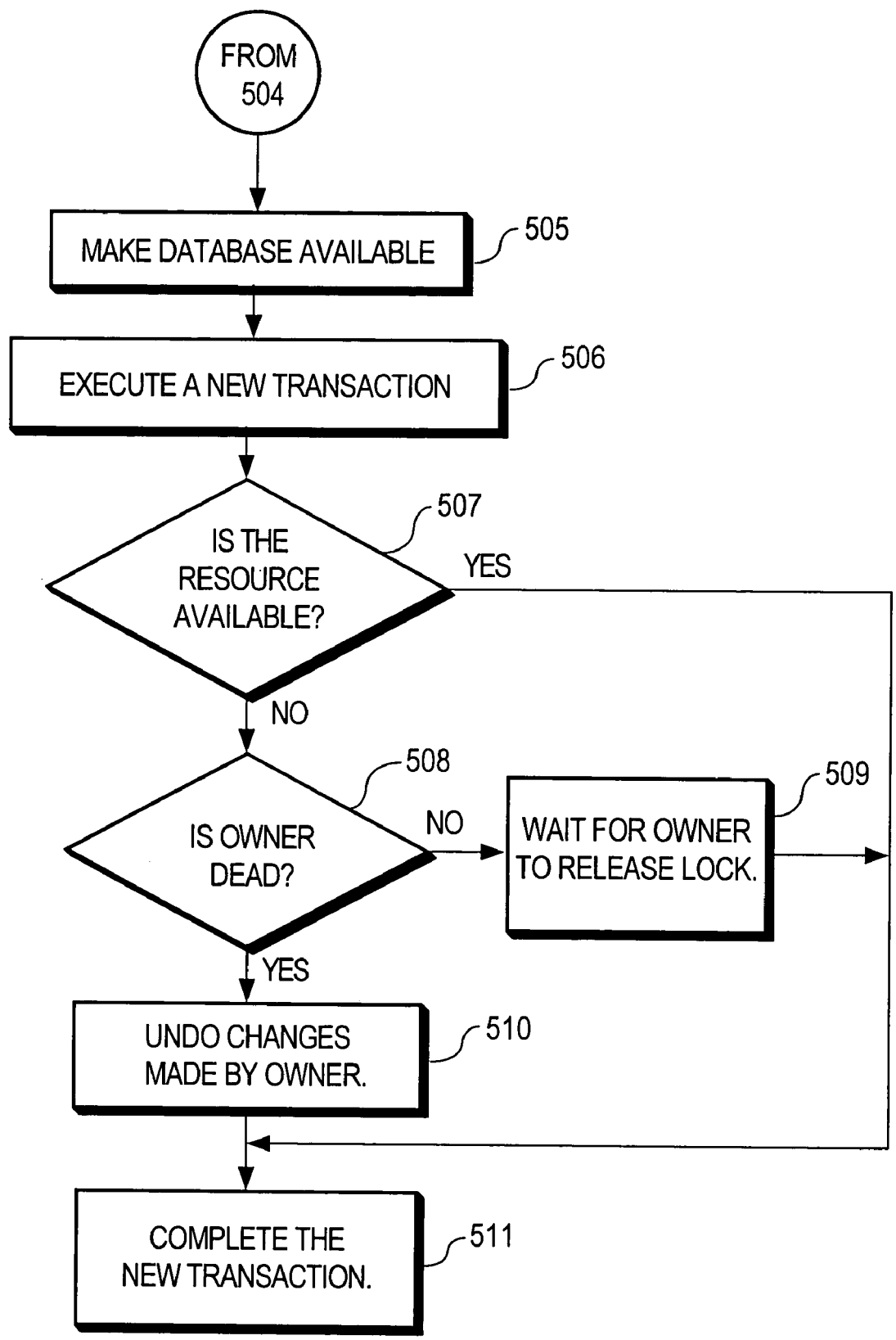
FIG. 5B is another portion of the flow diagram illustrating a method for recovering after an instance or transaction failure in a database.

FIGS. 5A and 5B are a flow diagram illustrating a method for recovering after an instance failure in a database. At step 500, cache recovery is performed. Cache recovery involves updating the database to reflect changes that had been made to cached blocks of data prior to the crash, as recorded in the redo log, but which had not yet been applied to the database at the time of the crash. As mentioned earlier, cache recovery typically involves applying a plurality of changes recorded in a redo log to data files in the database.

At step 501, transaction information that corresponds to a transaction associated with an instance that crashed is found. In one embodiment of the present invention, the transaction information is in the form of a transaction table such as the table illustrated in FIG. 3. The transaction table includes entries corresponding to transactions that existed in an instance. Finding transaction information corresponding to a transaction associated with an instance that crashed can be achieved by identifying a rollback segment associated with the instance that crashed. Once a rollback segment associated with the instance that crashed is identified, a transaction table in the rollback segment may be accessed.

At step 502, it is determined based on the transaction information whether the transaction associated with the instance that crashed was active. This determination can be achieved by reading status information in the transaction table. The status information will indicate whether the transaction was committed or active at the time of the instance failure. If the transaction was active when the instance crashed, then control proceeds to step 503. If the transaction was committed when the instance crashed, then control proceeds to step 504.

At step 503, the transaction information is updated to indicate that the transaction is dead. This can be achieved by setting a flag in a field of an entry that is associated with the transaction in the transaction table. For example, a bit may be set in the "DEAD" field of the transaction table entry that corresponds to the transaction (see FIG. 3).

At step 504, it is determined whether all the transactions are processed. If all the transactions are processed, control proceeds to step 505. If not all the transactions are processed, control returns to step 501.

At step 505, the database is made available to the users. By making the database available to the users after updating the transaction information and before undoing any updates performed by the dead transaction, the present method for recovery allows the user to access data that was not affected by the instance crash almost immediately after the crash. Thus, the users are not penalized by having to wait for the DBMS to recover data files which the users would otherwise not need to access.

At step 506, a new transaction is executed. When the new transaction requests access to a resource, it is determined whether the resource is available or unavailable (step 507). The resource will not be available if resources is locked by another transaction. Determining whether a resource is available or unavailable can be achieved by checking the write lock indicator in the data section of a container. If the resource is unavailable, then control proceeds to step 508. If the resource is available, then control proceeds to step 511.

At step 508, it is determined whether the locked resource belongs to a dead transaction (i.e. a transaction that was active and uncommitted at the time of the crash). Determining whether a resource belongs to a dead transaction can be achieved by first checking the transaction list of the container that corresponds to the resource, such as container 400 illustrated in FIG. 4, to determine the identity of the owner of the resource. Once the owner of the resource is identified, transaction information corresponding to the owner (e.g. the transaction table entry for the owner) is found to determine whether the owner is a transaction which is dead. If the resource belongs to an owner that is not dead, control proceeds to step 509. If the resource belongs to an owner that it is dead, control proceeds to step 510.

At step 509, control proceeds to wait for the resource to be made available. When the current owner of the resource completes, the lock on the resource will be released.

At step 510, the new transaction makes the resource available (unlocks the resource) by undoing some or all of the changes made by the dead transaction, including those changes which caused the resource to be locked. To undo the changes, the new transaction retrieves a location of one or more undo records for the transaction which locked the resource. After the undo records are retrieved, the operations specified in the undo records are executed and the lock to the resource is released.

At step 511, the new transaction accesses the resource and completes the transaction.

According to one embodiment of the present invention, the new transaction undoes other changes made by the other dead transactions after undoing the change made by the dead transaction that locked the resource. The new transaction accesses other undo records which are linked to the undo record associated with the portion of the change which locked the resource, and executes operations in these roll back entries.

According to an alternate embodiment of the present invention, the new transaction ceases rolling back the dead transaction after a predetermined amount of undo records from the undo records have been executed. The policy of limiting the amount of rollback a new transaction must perform places a cap on the performance penalty that new transactions will suffer when blocked by a dead transaction.

According to still an alternate embodiment of the present invention, the new transaction only undoes the changes which locked the resource that were made by the dead transaction.

In another embodiment of the present invention, the new transaction undoes all changes made by the dead transaction that died with a lock on the resource.

BACKGROUND ROLLBACK

An independent background process dedicated to rolling back changes made by dead transactions can be used instead of or in combination with causing new transactions to roll back the dead transactions that block them.

In one embodiment, an independent recovery process makes multiple passes over all the transactions that need recovery and applies only a predefined number of undo records per dead transaction per pass. Thus, instead of sequentially rolling back entire transactions which are marked dead, the independent recovery process applies a predefined number of undo records of a dead transaction and then proceeds to the next dead transaction. The process of applying only a predefined number of undo records for a dead transaction before moving on to another dead transaction is referred to as time slicing. Another technique for time slicing the rollback operation involves applying undo records of one dead transaction for a predefined amount of time (i.e. a time slice period) before moving on to the next dead transaction.

Time slicing during rollback prevents the rollback of long transactions that are dead from imposing long delays on the rollback of shorter transactions that are dead. In another embodiment of the present invention, the independent recovery process recovers short running transactions before longer running transactions. This prevents the longer transactions from holding up the recovery process.

RECOVERY AFTER A TRANSACTION FAILURE

Figure 6:
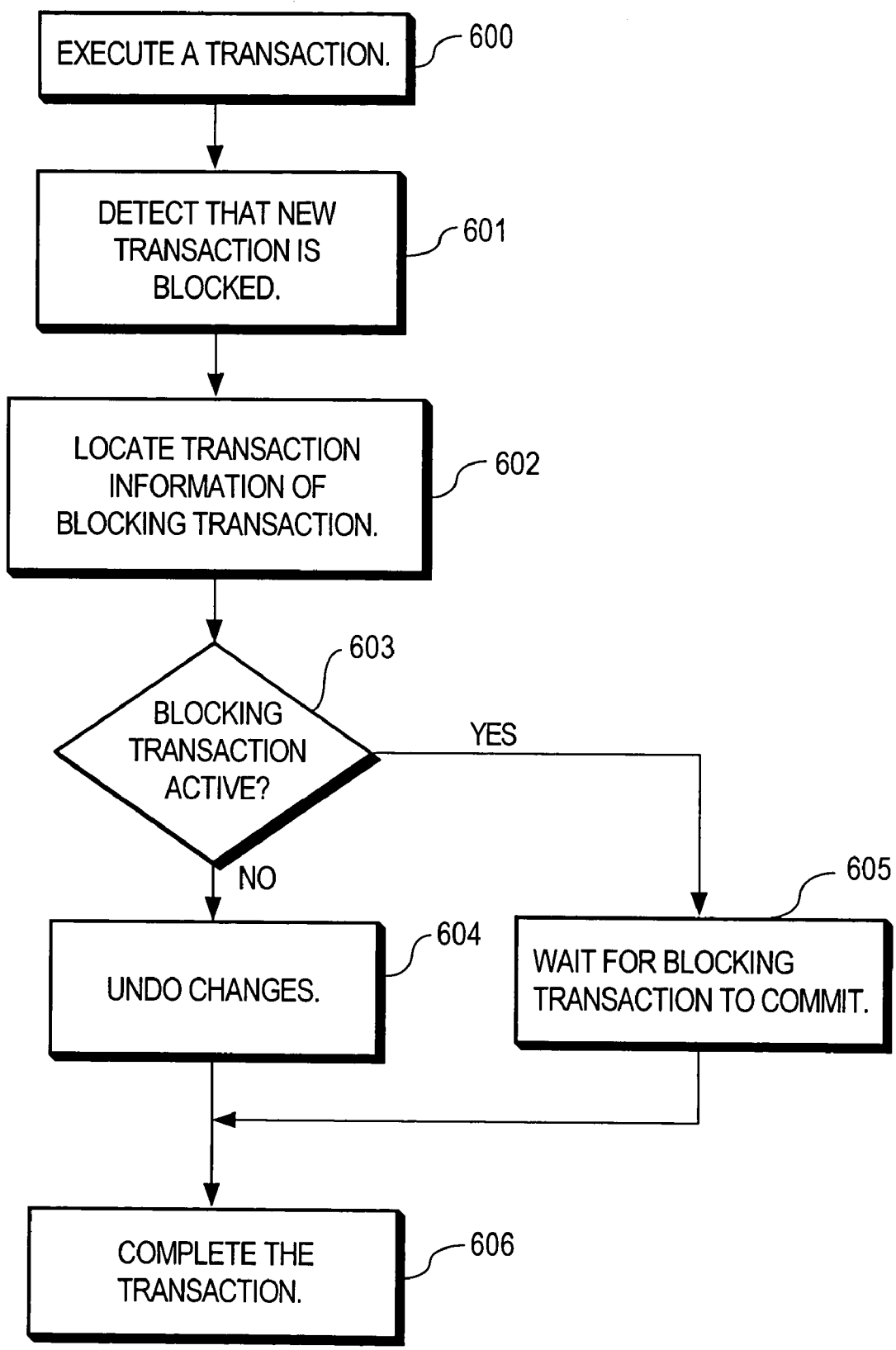
FIG. 6 is a flow chart illustrating a method for recovering after a transaction failure in a database.

FIG. 6 is a flowchart illustrating a method for recovering after a transaction prematurely terminates. These steps may be performed when a new transaction attempts to access a resource that is held by another transaction. At step 600, a new transaction is executed.

At step 601, the system detects that a new transaction is blocked. The detection is achieved when the new transaction attempts to access a resource held by another transaction.

At step 602, transaction information that corresponds to the blocking transaction is found. In one embodiment of the present invention, the transaction information is in the form of an entry in a transaction table such as the table 310 illustrated in FIG. 3. As explained above, the transaction table 310 includes entries, each of which corresponds to and reflects the current state of the transactions.

At step 603, it is determined, based on the transaction information, whether the blocking transaction is an active transaction or a dead transaction. This determination can be achieved by reading status information in the transaction table and gaining access to a memory structure indicating that the transaction is still alive. The status information will indicate whether the transaction is active or committed. According to one embodiment, whether the blocking transaction is dead or alive is determined by the acquisition of an exclusive lock associated with the blocking transaction. If the exclusive lock can be acquired, then the blocking transaction is either dead or committed. In certain embodiments, a dead status is indicated by an active status flag in a transaction table of an instance that crashed. If the transaction is dead, then control proceeds to step 604. If the transaction is active, then control proceeds to step 605.

At step 604, the new transaction undoes some or all of the changes made by the blocking transaction, including those changes which caused the resource to be locked. To undo the changes, the new transaction retrieves a location of one or more undo records for the transaction which locked the resource. After the undo records are retrieved, the operations specified in the undo records are executed and the lock to the resource is released.

At step 605, the system waits for the blocking transaction to commit.

At step 606, the new transaction accesses the resource and completes the transaction.

PARALLEL TRANSACTION RECOVERY

A drawback associated with using a single independent background process to rollback changes made by dead transactions is that a single thread of recovery induces a scalability bottleneck in the system. Recovering a crashed instance that is associated with a large amount of transaction undo information takes a proportional amount of time to recover. The lack of a scalable recovery mechanism severely reduces the availability of the portion of the database associated with dead transactions.

The problem of recovering a crashed instance serially is particularly apparent in systems that employ parallel transaction execution in the forward direction. For example, if 60 transactions are executed in parallel in the forward direction, and the instance executing the transactions fails after only 10 minutes of execution, recovery of the dead transactions using a serial recovery mechanism may require more than ten (10) hours to complete.

Another drawback associated with serially recovering a crashed instance is that a relatively large number of system cycles may be wasted in context switching from one dead transaction to another if time slicing is employed. For example, to achieve fairness during recovery, time slicing is generally performed in a round robin fashion over all dead transactions. Therefore, only a particular number of undo records are recovered from a dead transaction during a particular time slice period. Once the time slice period expires, a context switch must be performed before recovery of the next dead transaction can begin. Only after the context switching completes can the recovery process continue recovering undo records from another dead transaction for the next time slice period.

According to an embodiment of the invention, multiple processes (referred to herein as recovery servers) are used to perform recovery operations in parallel when it is determined that it would be more efficient to recover the dead transactions in parallel. Using multiple recovery servers, a parallel transaction recovery mechanism can be implemented that increases the scalability of the recovery process by allowing dead transactions to be recovered in parallel. This increase in scalability provides for an increased recovery throughput.

Figure 7:
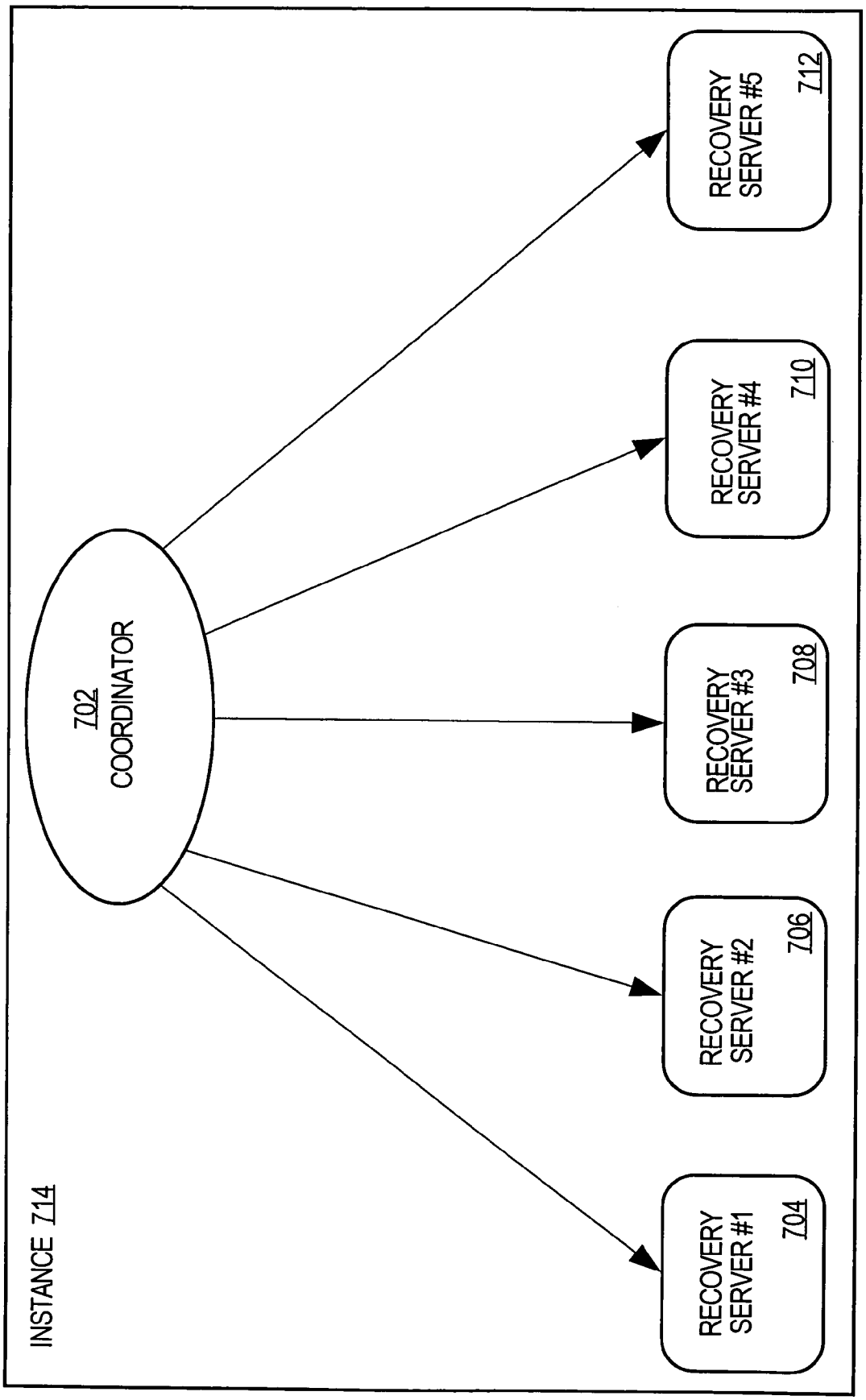
FIG. 7 illustrates a parallel transaction recovery system according to an embodiment of the invention.

For example, FIG. 7 illustrates a transaction recovery system 700 that employs a parallel transaction recovery mechanism to efficiently recover dead transactions according to certain embodiments of the invention. A recovery coordinator 702, contained in instance 714, is a thread of execution that coordinates the recovery of dead transactions. Recovery coordinator 702 is responsible for efficiently managing the recovery of dead transactions within instance 714 and for handling cross-instance calls to coordinate load balancing and rollback segment ownership across multiple instances.

In managing the recovery of dead transactions, coordinator 702 determines an efficient number of recovery servers to be used for recovering the dead transactions. Therefore, in certain embodiments, if the coordinator 702 determines that it would not be efficient to recover dead transactions in parallel, the coordinator 702 itself recovers the dead transactions without spawning other recovery servers.

As depicted in FIG. 7, recovery coordinator 702 determined that it would be efficient to spawn five recovery servers to assist in the recovery of dead transactions. By spawning multiple recovery servers 704, 706, 708, 710 and 712, recovery coordinator 702 provides a degree five of parallelism for recovering dead transactions within instance 714. In certain embodiments, in addition to spawning recovery servers, the coordinator 702 itself also functions to recover dead transactions. For example, by having coordinator 702 also functioning to recover dead transactions, six degrees of parallelism for recovering dead transactions is provided within instance 714.

Recovering transactions in parallel can also provide the benefit of requiring a smaller number of context switches during the recovery of multiple dead transactions. The context switching is reduced because a particular recovery server will not be required to time slice through all dead transactions.

LOCATING ROLLBACK SEGMENTS AND DEAD TRANSACTIONS

As stated above, a dead transaction is a transaction that was active within an instance when the instance crashed. Dead transactions are associated with a particular transaction table that is contained in a particular rollback segment. Each dead transaction contains one or more undo records that must be processed before a particular resource associated with the undo record can be made available.

During the recovery process, no more than one recovery server is assigned to a given dead transaction at any time. However, recovery servers can simultaneously recover different transactions within a common rollback segment. In addition, a particular recovery server may be assigned to recover transactions that reside in more than one rollback segment.

While an instance is executing, the instance is said to "own" the rollback segments that contain the transaction tables and undo records for the transactions executed by the instance. A particular rollback segment can only be owned by a single instance at any one time. After an instance fails, the rollback segments for the transactions that were in the failed instance are considered unowned, and therefore may be processed by other instances. When the failed instance is restarted, the failed instance once again assumes ownership of those rollback segments.

Figure 8:
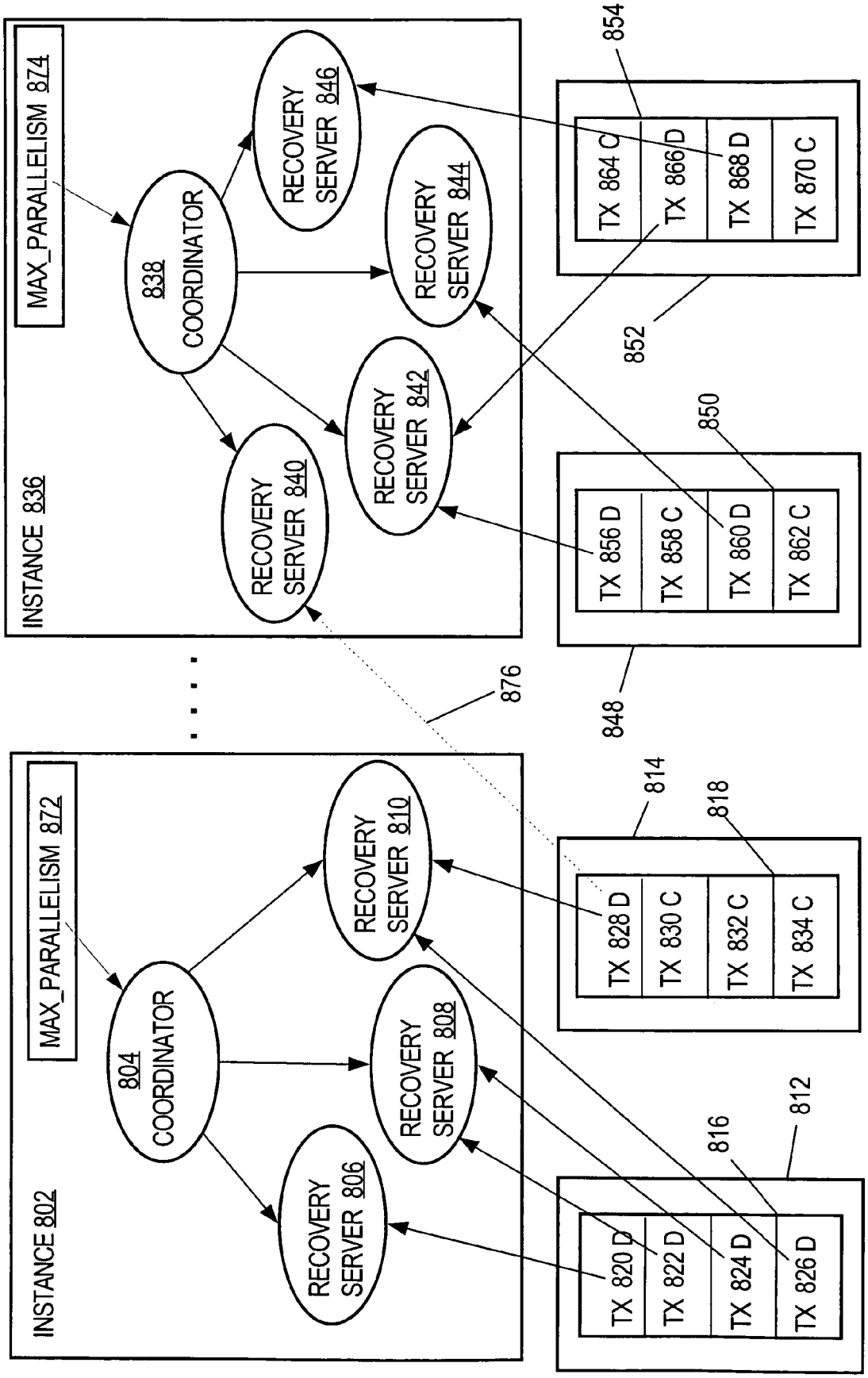
FIG. 8 illustrates a parallel transaction recovery system according to an embodiment of the invention.

FIG. 8 is an illustration of a database system 800 that supports parallel transaction recovery according to an embodiment of the invention. Instances 802 and 836 represent two separate instances that are currently performing parallel transaction recovery. However, as indicated by the dashed line from dead transaction 828 to recovery server 840, prior to the restart of instance 802, instance 836 was associated with and actively recovering rollback segment 814.

For the purpose of explanation, it shall be assumed that instance 802 had crashed, and has subsequently been restarted. Rollback segments 812 and 814 represent two separate rollback segments that were previously associated with instance 802 before it crashed. Respectively associated with rollback segments 812 and 814 are transaction tables 816 and 818.

As depicted, transaction table 816 lists four dead transactions 820, 822, 824 and 826, while transaction table 818 lists dead transaction 828 and committed transactions 830, 832 and 834. Each of the dead transactions have one or more undo records (not shown) that need to be processed.

Recovery coordinator 804, contained in instance 802, is a thread of execution that coordinates the recovery of dead transactions. Recovery coordinator 804 is responsible for managing the parallel recovery of dead transactions within instance 802. In certain embodiments, recovery coordinator 804 is also responsible for handling cross instance calls to obtain ownership of previously owned rollback segments.

As illustrated in FIG. 8, coordinator 804 has delegated the job of recovering dead transactions identified in rollback segments 812 and 814 to recovery servers 806, 808 and 810 in order to recover dead transactions in parallel. According to one embodiment, recovery servers 806, 808 and 810 are processes that have been spawned by recovery coordinator 804 on an as-needed basis. In certain embodiments, coordinator 804 itself recovers dead transactions, either because the current recovery job is not significant enough to merit the overhead of multiple recovery servers, or in combination with other recovery servers.

The dashed line from dead transaction 828 to recovery server 840 indicates that instance 836 was associated with and actively recovering rollback segment 814 when instance 802 was restarted. As indicated by the line from transaction 828 to recovery server 810, instance 802 has re-established itself as owner of rollback segment 814 and is currently recovering dead transaction 828 through recovery server 810.

Associated with instance 802 is max_parallelism variable 872. The max_parallelism variable 872 represents an upper bound on the number of recovery servers that can be spawned by a particular coordinator at any one time. If the value of max_parallelism 872 is set equal to one, parallel transaction recovery is inhibited and dead transactions are recovered serially by a single background process (i.e. coordinator 804). Depending on the number and size of the dead transactions, coordinator 804 may determine that it is more efficient to use a degree of parallelism that is less than the value of max_parallelism 872.

As depicted in FIG. 8, parallel recovery can be performed by each individual instance (e.g. instance 802 and 836). However, before an instance can perform parallel recovery on dead transactions in a rollback segment, the instance must own the rollback segment. A particular rollback segment can be owned only by one instance at any one point in time. In certain embodiments, for an instance to own a particular rollback segment it must first obtain a rollback segment lock (RS lock) on the particular rollback segment. An RS lock for a particular rollback segment can be held by only one instance any point in time. In certain embodiments, if a coordinator executing on an instance acquires an RS lock on a particular rollback segment, the particular rollback segment is considered to be owned by the instance in which the coordinator is executing.

When a crashed instance starts up, it attempts to re-acquire ownership of any rollback segment that it previously owned prior to failure. In certain embodiments, if a recovery server on a remote instance is currently recovering dead transactions contained in a previously owned rollback segment, when the crashed instance start up, it requests the remote instance to halt recovery of the dead transactions and to release it's lock (RS lock) on the rollback segment. In certain embodiments, cross instance coordination of rollback segments is performed by the coordinator of each instance. For example, as indicated by dashed line 876, when instance 802 starts up, it requests instance 836 to halt recovery of dead transactions and release its locks on rollback segment 814. Once instance 836 halts its recovery and releases its locks on rollback segment 814, instance 802 can acquire a lock and begin recovery of dead transactions in rollback segment 814.

Once the recovery server on the remote instance halts its recovery of the dead transactions, the recovery server notifies the coordinator associated with the remote instance, which in turn releases it's lock on the previously owned rollback segment. Thereafter, the crashed instance re-acquires ownership of the previously owned rollback segment. In certain embodiments, the recovery server halts recovery of the dead transaction before the transaction is completely recovered. In an alternative embodiment, the recovery server completes recovery of the dead transaction before notifying the coordinator associated with the remote instance.

For example, if rollback segment 814 was owned previously owned by instance 802 when it failed, instance 802 will attempt to re-acquire ownership of rollback segment 814 at startup. As shown by the dashed arrow between recovery server 840 and dead transaction 828, at the time instance 802 was restarted, rollback segment 814 was currently owned by instance 836 and dead transaction 828 was currently being rolled back by recovery server 840.

Thus, when instance 802 begins executing, coordinator 804 requests coordinator 838 to halt recovery and release its lock on rollback segment 814. Upon receiving the request, coordinator 838 signals recovery server 840 to halt recovery of dead transaction 828. Once recovery server 840 halts its recovery of dead transaction 828 and coordinator 838 relinquishes ownership of rollback segment 814, coordinator 804 can obtain a lock on rollback segment 814 and then assign recovery server 810 to recover dead transaction 828. In certain embodiments, coordinator 804 uses the transaction table entry associated with dead transaction 828 to determine where to begin recovery of the dead transaction 828.

In addition to the previously owned rollback segments, a re-started instance may also associate itself with any rollback segment that is not currently owned by another instance. For example, if an instance crashes, the rollback segments that were previously owned by the crashed instance become unowned. Once a rollback segment becomes unowned, another instance may acquire ownership of the rollback segment. After an instance acquires ownership of the previously unowned rollback segment, it can then begin recovery of the dead transactions that are contained in the rollback segment.

CONCURRENCY CONTROL DURING PARALLEL RECOVERY

As previously stated, before a coordinator assigns a recovery server to recover a dead transaction, the coordinator must first obtain ownership of the dead transaction to prevent other processes from trying to recover the dead transaction at the same time. To maintain concurrency control during recovery, in certain embodiments, a set of locks is used to prevent multiple processes from concurrently trying to recover the same dead transaction. In one embodiment, the set of locks includes rollback segment locks (RS locks), transaction table locks (TT locks) and transaction link locks (TL locks). As previously stated, the RS lock is used by a coordinator to lock a particular rollback segment. The TT lock is used to lock a particular transaction table that is associated with a particular rollback segment. The TL lock is used to lock a particular chain of undo records that is associated with an entry in a particular transaction table.

Figure 9A:
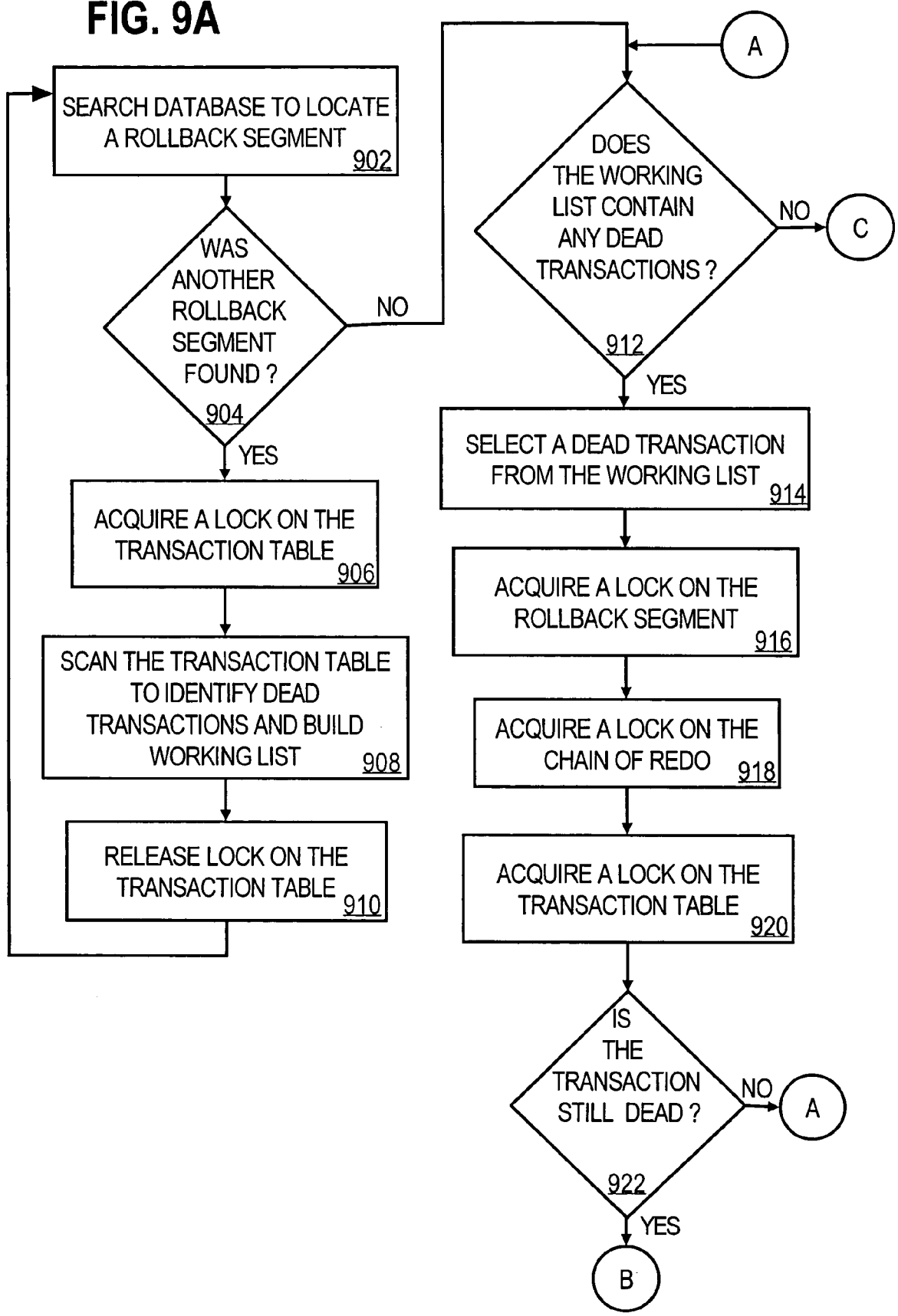
FIG. 9A is a portion of a flow diagram in which a coordinator uses a set of locks is to maintain concurrency control during the recovery of dead transactions in accordance with an embodiment of the invention.
Figure 9B:
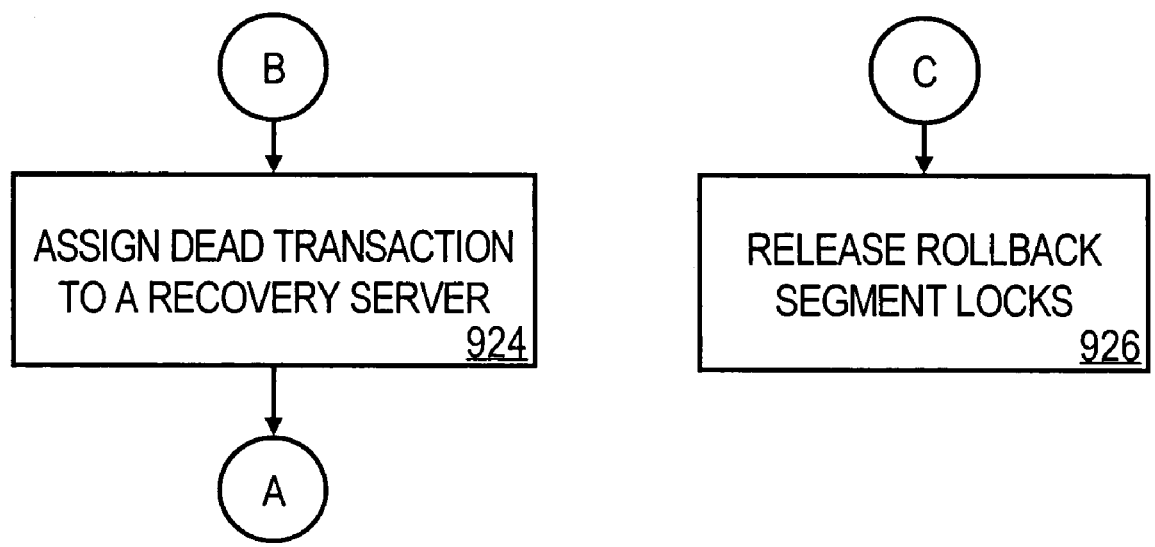
FIG. 9B is another portion of the flow diagram in which a coordinator uses a set of locks is to maintain concurrency control during the recovery of dead transactions in accordance with an embodiment of the invention.

FIGS. 9A and 9B depict a flow diagram in which a coordinator uses a set of locks is to maintain concurrency control during the recovery of dead transactions in accordance with an embodiment of the invention. FIGS. 9A and 9B are described with references to the components of FIG. 3.

At step 902, the coordinator searches the database system to find a rollback segment that may contain dead transactions that need to be recovered.

At step 904, if the coordinator does not find another rollback segments, then control proceeds to step 912. However, if the coordinator does find another rollback segment, then at step 906 the coordinator obtains a TT lock on a transaction table that is associated with the rollback segment. By obtaining the TT lock, the coordinator prevents other processes from updating the information contained in the transaction table.

At step 908, the coordinator scans the transaction table to identify any dead transactions that need to be recovered. In certain embodiments, the coordinator examines the DEAD field of each entry in the transaction table to identify dead transactions. As dead transaction are identified they are added to a working list that is maintained by the coordinator. For example, by scanning transaction table 310, the coordinator identifies entries 374 and 378 as being associated with dead transactions. Entries 374 and 378 are then added to the coordinator" working list.

At step 910, the coordinator releases its TT lock on the transaction table and control proceeds to step 902 to search for another rollback segment that may contain dead transactions that need to be recovered.

At step 912, the coordinator determines if the working list contains any dead transaction that need to be recovered. If the coordinator determines the working list does not contain any dead transaction that need to be recovered, then control proceeds to step 926.

However, if at step 912 the coordinator determines the working list does contain one or more dead transactions that need to be recovered, then at step 914 the coordinator selects a dead transaction and removes it from the working list.

At step 916, the coordinator acquires an RS lock on the rollback segment that contains the transaction table which holds the entry associated with the dead transaction. In this example, using its working list, the coordinator identifies entry 374 as being associated with a dead transaction that needs to be recovered. The coordinator then acquires an RS lock on rollback segment 300.

At step 918, the coordinator acquires a TL lock on the chain of undo records that is associated with the dead transaction. By obtaining the TL lock on a particular chain of undo, the coordinator prevents other processes from performing recovery on the same chain of undo. In this example, it shall be assumed that the coordinator obtained a TL lock on the undo chain associated with entry 374. By having the coordinator maintain the TL locks, if a recovery server dies, the coordinator can reassign the dead transaction to another recovery server.

At step 920, the coordinator acquires a TT lock on the transaction table that contains the entry associated with the dead transaction. In this example, the coordinator obtains a TT lock on transaction table 310.

At step 922, the coordinator verifies that the dead transaction is still "DEAD". This step is used to ensure that another process had not recovered the dead transaction after it was added to the coordinator's working list, but before the coordinator acquired the TL lock. In the present example, the coordinator obtains a lock on transaction table 310 and then examines the DEAD field 342 in entry 374 to determine whether the corresponding transaction needs to be recovered. If the corresponding transaction no longer needs to be recovered, then control proceeds to step 912 to determine if the working list contains any more dead transaction that needs to be recovered.

If at step 922 the coordinator determines the that the dead transaction is still "DEAD", then the coordinator releases its TT lock on the transaction table and control proceeds to step 924. However, if at step 922, the coordinator determines the that the dead transaction is not still "DEAD", then the coordinator releases its TT lock on the transaction table and control proceeds to step 918.

At step 924, the coordinator assigns the dead transaction to a recovery server to perform recovery of the dead transaction. In certain embodiments, a recovery server may be assigned to recover another dead transaction before completing the recovery of previously assigned dead transactions. In one embodiment, the coordinator recovers the dead transaction itself. Determining the number of recovery servers to spawn is discussed in detail below. Control then proceeds to step 912 to determine if the working list contains any more dead transaction that needs to be recovered.

At step 926, the coordinator releases its RS locks on the rollback segments. In certain embodiments, the coordinator releases a RS lock on a rollback segment when it determines that it no longer has any dead transactions in its working list that are associated with the rollback segment. In one embodiment, the coordinator releases its lock on a rollback segment whenever it assigns the dead transaction to a recovery server. For example, in certain embodiments, after the coordinator assigns the dead transaction to a recovery server in step 924, it proceeds to release its lock on the rollback segment. By releasing the rollback segment lock another process may obtain control of the rollback segment to perform recovery of dead transactions. However, by maintaining a rollback segment lock until the coordinator has recovered all dead transaction in its working list that are associated with the rollback segment, the number of pings in the database system can be reduced.

In certain embodiments, the coordinator continually searches the database system for rollback segments that contain transaction tables having entries that correspond to dead transactions. Whenever the coordinator identifies a dead transaction it is added to its working list. For example, in one embodiment, after the coordinator releases its RS locks on the rollback segments in step 926, control proceeds to step 902 to once again search the database system for rollback segments.

RECOVERING A DEAD TRANSACTION

Figure 10:
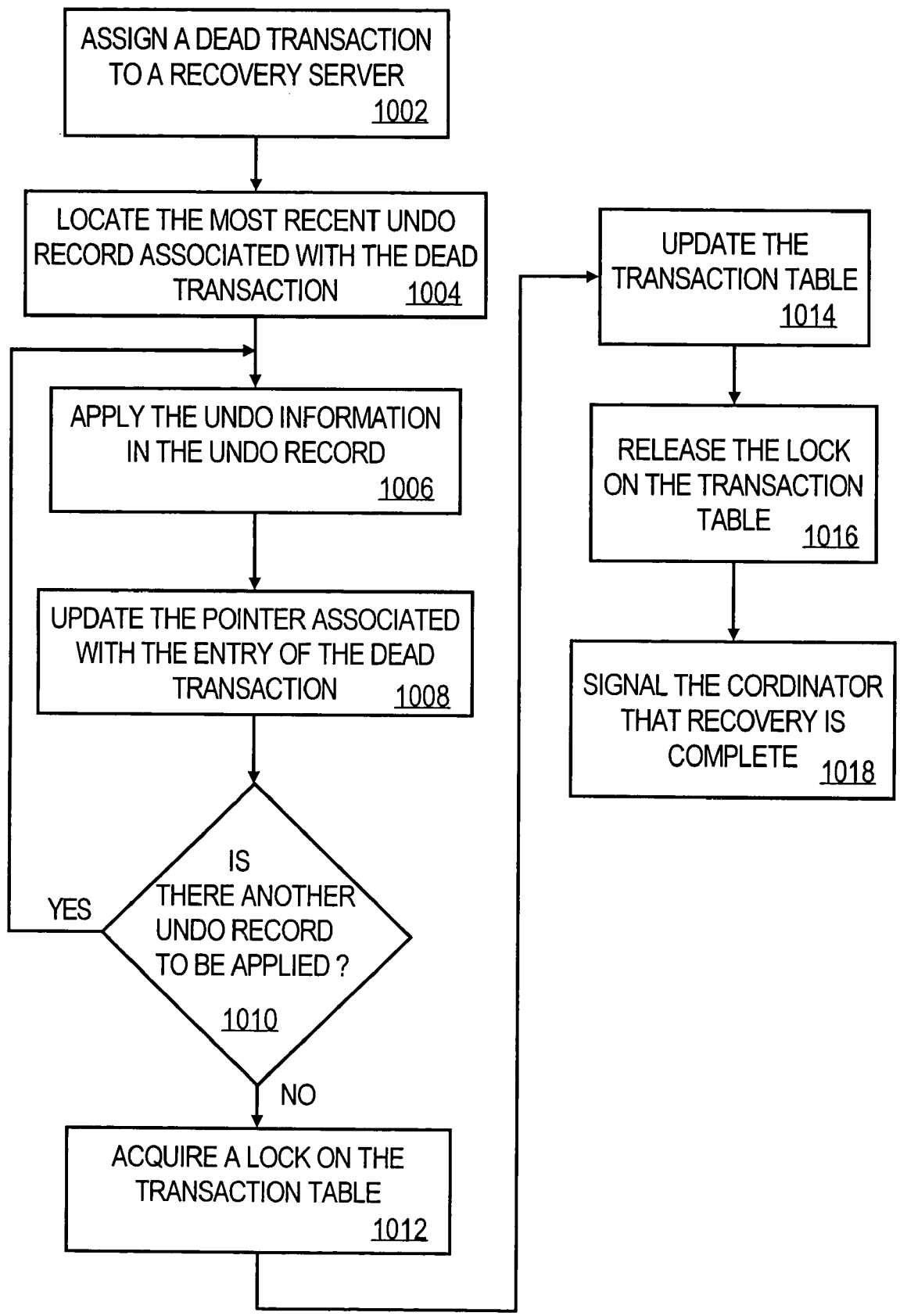
FIG. 10 illustrates the recovery of a dead transaction according to an embodiment of the invention.

FIG. 10 illustrates the recovery of a dead transaction according to an embodiment of the invention. FIG. 10 is described using the components of FIG. 3.

At step 1002, a recovery server is assigned a dead transaction by the coordinator. It shall be assumed that the recovery server was assigned the dead transaction associated with entry 374 in transaction table 310.

At step 1004, the recovery server locates the redo record that contains the most recent undo information associated with the dead transaction. In certain embodiments, the recovery process uses the pointer 346 associated with entry in the transaction table that corresponds to the dead transaction to locate the most recent undo record. For example, the pointer 346 associated with entry 374 is used to locate undo record 356.

At step 1006, the undo information contained in the undo record is applied to the corresponding data blocks. To apply the change information, a lock is first obtained on the corresponding data block and the change information contained in the undo record is then applied to the data block.

At step 1008, the pointer 346 associated with entry in the transaction table that corresponds to the dead transaction is updated to point to the next most recent undo record if one exists. In certain embodiments, the pointer 346 is updated by setting it equal to the point 376 of the redo record whose redo information was just applied. For example, the pointer 346 of entry 374 is set equal to, the pointer 376 of redo record 350. This causes the pointer 346 of entry 374 to point to undo record 352 (the next most recent undo record).

At step 1010, the recovery server determines whether more undo information needs to be applied. In certain embodiments, the pointer associated with the undo record that contains the least recent undo information, points to NULL. Thus, in certain embodiments, when the pointer 346 associated with entry in the transaction table that corresponds to the dead transaction points to NULL, then the coordinator determines that all undo records have been applied for the dead transaction.

If at step 1010, the recovery server determines that more undo information needs to be applied, then control proceeds to step 1006 to apply the undo information.

However, if at step 1010, the recovery server determines that no more undo information needs to be applied, then at step 1012 the recovery server acquires a TT lock on the transaction table.

At step 1014, the recovery server updates the transaction table to indicate that the dead transaction has been recovered. In certain embodiments, the recovery server updates the "DEAD" field to indicate that the dead transaction is no longer to be considered dead.

At step 1016, the recovery server releases its lock on the transaction table.

At step 1018, the recovery server signals the coordinator that it has finished recovering the dead transaction that was assigned. The coordinator then releases its lock on the chain of undo and assigns another dead transaction to the recovery server.

Although in step 1002 the coordinator assigns a recovery server to recover the dead transaction, in certain embodiments, the coordinator itself may perform the recovery of the dead transaction. In one embodiment, to recover a dead transaction, the coordinator follows steps 1004-1016 as previously described and thereafter releases its lock on the chain of undo.

DETERMINING THE NUMBER OF RECOVERY SERVERS

In certain embodiments, the coordinator determines the number of recovery servers to spawn based on certain statistical data. Using the statistical data, the coordinator can determine whether it would be cost effective to recover transactions in parallel and, if so, how many recovery servers should be spawned to process the dead transactions in parallel (e.g. a degree of recovery value). If the coordinator determines that it would not be cost effective to recover transactions in parallel, the coordinator itself recovers the dead transactions without spawning any recovery servers.

In certain embodiments, the statistical data is based on how much work must be performed to recover the dead transactions. In certain embodiments, the coordinator uses its working list to determine the amount of work that will be required to recover the dead transactions. For example, based on its working list the coordinator can determine such information as (1) the number of dead transaction it will attempt to recover; and (2) the total number of undo blocks that need to be recovered.

According to one embodiment, the block count field (FIG. 3) that is associated with each entry is used to determine the total number of undo blocks that need to be recovered. By adding together the value of the block count fields for all dead transactions that are contained in the coordinator's working list, the coordinator can calculate a total number of undo blocks that need to be recovered. Based on this total number of undo blocks, the coordinator can. then determine the number of recovery servers to spawn.

In certain embodiments, the coordinator reuses existing recovery servers rather than or in addition to spawning new recovery servers. The existing recovery servers may have been previously spawned for other purposes, such as to free up a particular resource required by an executing transaction.

In addition to the degree of recovery value, as determined by the statistical data, in certain embodiments, the coordinator uses a max_parallelism threshold value as a upper limit to the number of recovery servers that are spawned.

The max_parallelism threshold value provides an upper limit on the number of recovery servers that can be allocated to a particular coordinator at any one time. If the max_parallelism threshold value is set equal to one, parallel transaction recovery is inhibited and dead transactions are recovered by the coordinator without spawning any recovery servers. Although the max_parallelism threshold value provides an upper limit on the number of recovery servers that can be spawned at any one time, the coordinator may determine that a degree of parallelism that is less than the max_parallelism threshold value is more efficient. For example, if only four processors are available for executing recovery servers, then spawning more than four recovery servers may not yield any performance benefit, even though the max_parallelism threshold value is set to 25.

In certain embodiments of the invention, the max_parallelism threshold value can be updated by a particular user, such as a database administrator (DBA). For example, if a DBA wants to limit the number of recovery servers to free up system resources for other tasks, the user can adjust the max_parallelism threshold value accordingly. Thus a user can dynamically control the amount of system resources that are allocated for recovering dead transactions.

In certain embodiments of the invention, the spawned recovery servers are destroyed if they remain idle for a particular amount of time. For example, if a spawned recovery server is not scheduled to perform the recovery of dead transactions for over five minutes, then the spawned recovery server is terminated, either by itself or by the coordinator process.

In addition, in certain embodiments, the user can force the destruction of spawned recovery servers by reducing the degree of parallelism of the system below the number of currently spawned recovery servers.

To assist the user in determining an appropriate max_parallelism threshold value, in certain embodiments, an enterprise manager is provided that allows the user to obtain such information as the state of each transaction that is currently being recovered, the progress of each recovery server, and an estimated time value that represents an approximate completion time for each of the recovery servers. In certain embodiments of the invention, the progress of the recovery servers and the net progress of the transaction recovery process is dynamically presented to the user in the form of a bar graph.

In addition, in certain embodiments, recovery progress on a per transaction basis is also dynamically provided to the user in the form of a bar graph.

DETERMINING TIME SLICE VALUES

In certain embodiments of the invention, the recovery servers use a time slicing mechanism in an attempt to achieve fairness in the processing of dead transactions. For example, in certain embodiments a recovery server will process a particular dead transaction for a particular time slice period. At the end of the time slice period, the recovery server switches to another dead transaction and begins the recovery of undo records for that dead transaction for the next time slice period.

A particular time slice period can be determined using a variety of methods. For example, in one embodiment, the recovery servers determine the time slice period based on the total number of transactions that need to be recovered. In another embodiment, the recovery servers determine the time slice period based on the total amount of undo blocks that need to be processed.

For example, if the coordinator assigns recovery serverA to a first dead transaction that contains 2000 undo blocks and to a second dead transaction that contains 10,000 undo blocks, the coordinator may determine that a time slice value of 250 is a fair number of undo blocks to recover on each dead transaction for each time slice period. Thus, when the coordinator spawns recovery serverA, the coordinator causes recovery serverA to perform a round robin recovery of 250 undo blocks on the first dead transaction, then 250 undo blocks on the second dead transaction, then 250 undo blocks on the first dead transaction, and so on.

In an alternate embodiment, the recovery servers themselves determine their own recovery time slice values. For example, in one embodiment, the recovery server determines the time slice based the number of dead transactions and the total amount of undo blocks that it is assigned to recover.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for performing database recovery after a crash of an instance of a database, wherein multiple transactions were active when the instance crashed, the method comprising:
   identifying a plurality of dead transactions;
   determining statistical data about the plurality of dead transactions;
   determining that a particular number of recovery servers should be used to recover the plurality of dead transactions based on the statistical data; and
   recovering the plurality of dead transactions using the particular number of recovery servers by executing the particular number of recovery servers in parallel.

2. The method of claim 1, wherein:
   the step of identifying the plurality of dead transactions includes the step of maintaining a working list, wherein the working list identifies a list of dead transactions for which recovery will be attempted; and
   the step of determining statistical data includes the step of determining statistical data based on the list of dead transactions.

3. The method of claim 2, wherein the step of maintaining a working list comprises the steps of:
   locating a rollback segment, wherein the rollback segment contains a transaction table that contains entries associated with dead transactions;
   scanning the transaction table to identify the dead transactions; and
   storing the identity of the dead transactions in the working list.

4. The method of claim 3, wherein:
   the method further comprises the step of maintaining a block count, wherein the block count identifies the number of undo blocks that are associated with a particular transaction; and
   the step of determining statistical data includes the step of determining a total number of undo blocks that need to be recovered, wherein the total number of undo blocks is based on the block count associated with the dead transactions identified in the working list.

5. The method of claim 3, wherein the step of determining statistical data includes the step of determining statistical data based on the number of dead transactions that are identified in the working list.

6. The method of claim 1, wherein the step of determining that the particular number of recovery servers should be used includes the step of determining that the particular number of recovery servers should be used based on a max_parallelism threshold value, wherein the max_parallelism threshold value provides an upper limit for the number of recovery servers to be used.

7. The method of claim 6, further comprises the step of determining the max_parallelism threshold value based on a user input value.

8. The method of claim 1, further comprising the steps of:
   identifying a rollback segment that was previously owned by the crashed instance at the time of its crash; and
   the crashed instance reacquiring ownership of the rollback segment after the crashed instance is restarted.

9. The method of claim 8, wherein the step of reacquiring ownership of the rollback segment includes the steps of:
   identifying an instance that currently owns the rollback segment that was previously owned by the crashed instance at the time of its crash;
   requesting the instance to release ownership of the rollback segment; and
   the instance releasing ownership of the rollback segment in response to the request.

10. The method of claim 1, further comprises the steps of:
    identifying a rollback segment that is unowned, wherein the unowned rollback segment is not currently associated with any instance of the database; and
    associating the unowned rollback segment with the crashed instance, wherein associating the unowned rollback segment with the crashed node causes the rollback segment to be owned by the crashed instance.

11. The method of claim 1, wherein the step of recovering the plurality of dead transactions comprises the steps of:
    maintaining a working list, wherein the working list identifies a list of dead transactions for which recovery will be attempted;
    selecting a dead transaction from the working list;
    acquiring a rollback segment lock on a rollback segment, wherein the rollback segment is associated with a transaction table that contains an entry that corresponds to the dead transaction;

acquiring a transaction lock on a chain of undo, wherein the chain of undo contain change information associated with the dead transaction;

determining whether the dead transaction still needs to be recovered; and if the dead transaction still needs to be recovered, assigning the dead transaction to a recovery server.

12. The method of claim 11, wherein the step of acquiring the transaction lock includes the step of a coordinator acquiring the transaction lock.

13. The method of claim 12, wherein the method further comprises the steps of:

upon completing the recovery of the dead transaction, the recovery server signaling the coordinator to indicate it has completed the recovery of the dead transaction; and upon receiving the signal from the recovery server, the coordinator releasing its lock on the transaction.

14. The method of claim 1, wherein the step of recovering the plurality of dead transactions using the particular number of recovery servers includes the steps of:

assigning two or more dead transactions to a recovery server;

associating a time slice value with the recovery server, wherein the time slice value is used by the recovery server to promote fairness during recovery of the two or more dead transactions; and recovering the two or more dead transactions using the time slice value.

15. A computer-readable storage medium storing instructions for performing database recovery after a crash of an instance of a database, wherein multiple transactions were active when the instance crashed, wherein the processing of the instructions by one or more processors in one or more computers causes:

identifying a plurality of dead transactions;

determining statistical data about the plurality of dead transactions;

determining that a particular number of recovery servers should be used to recover the plurality of dead transactions based on the statistical data; and recovering the plurality of dead transactions using the particular number of recovery servers by executing the particular number of recovery servers in parallel.

16. The computer-readable storage medium of claim 15, wherein:

the step of identifying the plurality of dead transactions includes the step of maintaining a working list, wherein the working list identifies a list of dead transactions for which recovery will be attempted; and the step of determining statistical data includes the step of determining statistical data based on the list of dead transactions.

17. The computer-readable storage medium of claim 16, wherein the step of maintaining a working list comprises the steps of:

locating a rollback segment, wherein the rollback segment contains a transaction table that contains entries associated with dead transactions;

scanning the transaction table to identify the dead transactions; and storing the identity of the dead transactions in the working list.

18. The computer-readable storage medium of claim 17, wherein:

the computer-readable medium further stores instructions which, when processed by the one or more processors in the one or more computers, causes maintaining a block count, wherein the block count identifies the number of undo blocks that are associated with a particular transaction; and the step of determining statistical data includes the step of determining a total number of undo blocks that need to be recovered, wherein the total number of undo blocks is based on the block count associated with the dead transactions identified in the working list.

19. The computer-readable storage medium of claim 17, wherein the step of determining statistical data includes the step of determining statistical data based on the number of dead transactions that are identified in the working list.

20. The computer-readable storage medium of claim 15, wherein the step of determining that the particular number of recovery servers should be used includes the step of determining that the particular number of recovery servers should be used based on a max_parallelism threshold value, wherein the max_parallelism threshold value provides an upper limit for the number of recovery servers to be used.

21. The computer-readable storage medium of claim 20, further storing instructions which, when processed by the one or more processors in the one or more computers, causes determining the max_parallelism threshold value based on a user input value.

22. The computer-readable storage medium of claim 15, further storing instructions which, when processed by the one or more processors in the one or more computers, causes:

identifying a rollback segment that was previously owned by the crashed instance at the time of its crash; and the crashed instance reacquiring ownership of the rollback segment after the crashed instance is restarted.

23. The computer-readable storage medium of claim 22, wherein the step of reacquiring ownership of the rollback segment includes the steps of:

identifying an instance that currently owns the rollback segment that was previously owned by the crashed instance at the time of its crash;

requesting the instance to release ownership of the rollback segment; and the instance releasing ownership of the rollback segment in response to the request.

24. The computer-readable storage medium of claim 15, further storing instructions which, when processed by the one or more processors in the one or more computers, causes:

identifying a rollback segment that is unowned, wherein the unowned rollback segment is not currently associated with any instance of the database; and associating the unowned rollback segment with the crashed instance, wherein associating the unowned rollback segment with the crashed node causes the rollback segment to be owned by the crashed instance.

25. The computer-readable storage medium of claim 15, wherein the step of recovering the plurality of dead transactions comprises the steps of:

maintaining a working list, wherein the working list identifies a list of dead transactions for which recovery will be attempted;

selecting a dead transaction from the working list;

acquiring a rollback segment lock on a rollback segment, wherein the rollback segment is associated with a transaction table that contains an entry that corresponds to the dead transaction;

acquiring a transaction lock on a chain of undo, wherein the chain of undo contain change information associated with the dead transaction;

determining whether the dead transaction still needs to be recovered; and if the dead transaction still needs to be recovered, assigning the dead transaction to a recovery server.

26. The computer-readable storage medium of claim 25, wherein the step of acquiring the transaction lock includes the step of a coordinator acquiring the transaction lock.

27. The computer-readable storage medium of claim 26, wherein the computer-readable medium further stores instructions which, when processed by the one or more processors in the one or more computers, causes:
upon completing the recovery of the dead transaction, the recovery server signaling the coordinator to indicate it has completed the recovery of the dead transaction; and
upon receiving the signal from the recovery server, the coordinator releasing its lock on the transaction.

28. The computer-readable storage medium of claim 15, wherein the step of recovering the plurality of dead transactions using the particular number of recovery servers includes the steps of:
assigning two or more dead transactions to a recovery server;
associating a time slice value with the recovery server, wherein the time slice value is used by the recovery server to promote fairness during recovery of the two or more dead transactions; and
recovering the two or more dead transactions using the time slice value.

29. A system for performing database recovery after a crash of an instance of a database, wherein multiple transactions were active when the instance crashed, the system comprising:
a memory;
one or more processors coupled to the memory; and
a set of computer instructions contained in the memory, the set of computer instructions including computer instructions which when executed by one or more processors, cause:
identifying a plurality of dead transactions;
determining statistical data about the plurality of dead transactions;
determining that a particular number of recovery servers should be used to recover the plurality of dead transactions based on the statistical data; and
recovering the plurality of dead transactions using the particular number of recovery servers by executing the particular number of recovery servers in parallel.

30. The system of claim 29, wherein:
the step of identifying the plurality of dead transactions includes the step of maintaining a working list, wherein the working list identifies a list of dead transactions for which recovery will be attempted; and
the step of determining statistical data includes the step of determining statistical data based on the list of dead transactions.

31. The system of claim 30, wherein the step of maintaining a working list comprises the steps of:
locating a rollback segment, wherein the rollback segment contains a transaction table that contains entries associated with dead transactions;
scanning the transaction table to identify the dead transactions; and
storing the identity of the dead transactions in the working list.

32. The system of claim 31, wherein:
the system further comprises the step of maintaining a block count, wherein the block count identifies the number of undo blocks that are associated with a particular transaction; and
the step of determining statistical data includes the step of determining a total number of undo blocks that need to be recovered, wherein the total number of undo blocks is based on the block count associated with the dead transactions identified in the working list.

33. The system of claim 29, wherein the step of determining that the particular number of recovery servers should be used includes the step of determining that the particular number of recovery servers should be used based on a max_parallelism threshold value, wherein the max_parallelism threshold value provides an upper limit for the number of recovery servers to be used.

34. The system of claim 29, further comprising the steps of:
identifying a rollback segment that was previously owned by the crashed instance at the time of its crash; and
the crashed instance reacquiring ownership of the rollback segment after the crashed instance is restarted.

35. The system of claim 29, further comprises the steps of:
identifying a rollback segment that is unowned, wherein the unowned rollback segment is not currently associated with any instance of the database; and
associating the unowned rollback segment with the crashed instance, wherein associating the unowned rollback segment with the crashed node causes the rollback segment to be owned by the crashed instance.

36. The system of claim 29, wherein the step of recovering the plurality of dead transactions comprises the steps of:
maintaining a working list, wherein the working list identifies a list of dead transactions for which recovery will be attempted;
selecting a dead transaction from the working list;
acquiring a rollback segment lock on a rollback segment, wherein the rollback segment is associated with a transaction table that contains an entry that corresponds to the dead transaction;
acquiring a transaction lock on a chain of undo, wherein the chain of undo contain change information associated with the dead transaction;
determining whether the dead transaction still needs to be recovered; and
if the dead transaction still needs to be recovered, assigning the dead transaction to a recovery server.

37. The system of claim 29, wherein the step of recovering the plurality of dead transactions using the particular number of recovery servers includes the steps of:
assigning two or more dead transactions to a recovery server;
associating a time slice value with the recovery server, wherein the time slice value is used by the recovery server to promote fairness during recovery of the two or more dead transactions; and
recovering the two or more dead transactions using the time slice value.

* * * * *

UNITED STATES PATENT AND TRADEMARK OFFICE
CERTIFICATE OF CORRECTION

PATENT NO. : 7,415,466 B2
APPLICATION NO. : 10/804976
DATED : August 19, 2008
INVENTOR(S) : Ganesh et al.

It is certified that error appears in the above-identified patent and that said Letters Patent is hereby corrected as shown below:

On sheet 13 of 13, in Figure 10, Box 1018, line 1, delete "CORDINATOR" and insert -- COORDINATOR --, therefor.

In column 2, line 66, delete "large," and insert -- large --, therefor.

In column 6, line 3, after "218" insert -- sends --.

In column 6, line 48, delete "an" and insert -- a --, therefor.

In column 17, line 9, delete "to," and insert -- to --, therefor.

In column 18, line 11, delete "can." and insert -- can --, therefor.

Signed and Sealed this

Sixteenth Day of March, 2010

David J. Kappos
*Director of the United States Patent and Trademark Office*